(12) United States Patent
Martin

(10) Patent No.: US 12,477,625 B2
(45) Date of Patent: Nov. 18, 2025

(54) APPARATUS AND METHOD FOR COMMUNICATION BETWEEN AN EMERGENCY CALLER AND AN EMERGENCY RESPONDER DEVICE

(71) Applicant: RapidSOS, Inc., New York, NY (US)

(72) Inventor: Michael John Martin, Long Island, NY (US)

(73) Assignee: RAPIDSOS, INC., New York, NY (US)

( * ) Notice: Subject to any disclaimer, the term of this patent is extended or adjusted under 35 U.S.C. 154(b) by 597 days.

(21) Appl. No.: 17/861,212

(22) Filed: Jul. 9, 2022

(65) Prior Publication Data

US 2023/0014760 A1    Jan. 19, 2023

Related U.S. Application Data

(60) Provisional application No. 63/220,428, filed on Jul. 9, 2021.

(51) Int. Cl.
*H04W 76/50*    (2018.01)
*H04W 4/02*    (2018.01)
*H04W 4/90*    (2018.01)

(52) U.S. Cl.
CPC .......... *H04W 76/50* (2018.02); *H04W 4/023* (2013.01); *H04W 4/90* (2018.02)

(58) Field of Classification Search
CPC ........ H04W 4/90; H04W 4/023; H04W 76/50
USPC ...................................................... 455/402.4
See application file for complete search history.

(56) References Cited

U.S. PATENT DOCUMENTS

| | | | |
|---|---|---|---|
| 9,014,661 B2 | 4/2015 | deCharms | |
| 10,419,915 B2 | 9/2019 | Mehta et al. | |
| 2011/0071880 A1 | 3/2011 | Spector | |
| 2011/0195687 A1* | 8/2011 | Das ....................... | H04W 4/024 |
| | | | 455/404.1 |
| 2017/0310827 A1* | 10/2017 | Mehta ................... | H04W 80/04 |
| 2017/0325056 A1 | 11/2017 | Mehta et al. | |

\* cited by examiner

*Primary Examiner* — Sam K Ahn
(74) *Attorney, Agent, or Firm* — CYGAN LAW OFFICES PC; Joseph T. Cygan

(57) ABSTRACT

A disclosed method includes: sending emergency data from a cloud server to an emergency network entity, the emergency data received by the cloud server from a mobile device; sending a link to an emergency responder device located in proximity to a location of the mobile device in response to the emergency network entity receiving the emergency data; and establishing a data connection between the cloud server and the emergency responder device in response to selection input from the emergency responder device selecting the link. The method may further include establishing a data connection between the mobile device and the emergency responder device in response to selection input from the emergency responder device selecting the link.

17 Claims, 19 Drawing Sheets

2101

Car Crash Alert
2 Min Ago

Vehicle

| | |
|---|---|
| Vin | 3H1999522HS000786 |
| Make | Make |
| Model | Model |
| Year | 2020 |
| Color | Blue |
| Event Time | 11/5/2021 11:31:55 AM |

Airbags

| Name | ROW1_Driver_Curtain |
|---|---|
| Deployed | True |
| Name | Roof |
| Deployed | False |

Impacts

| | |
|---|---|
| Rollover | Detected |
| Pedestrian Crash | Not_Equipped |
| Front Crash | Detected |
| Driver Side Crash | Not_Detected |
| Passenger Side Crash | Not_Equipped |
| Rear Crash | Unknown |
| Side Crash | Detected |
| Any Impact | Detected |
| Front Pretension | Detected |
| Ears Rear | Detected |
| Front High Severity | Detected |
| Front Lower Severity | Detected |
| Non Ears Rollover | Detected |
| Ears Roll Over | Detected |
| Sequence | 0 |

2102

Seats

| | |
|---|---|
| Row | 1 |
| Side | Driver |
| Occupancy | Occupied |
| Belt | Belted |
| Row | 2 |
| Side | Center |
| Occupancy | Child_Seat |
| Belt | Sensor_Error |

Velocity

| Velocity Type | VX |
|---|---|
| Velocity Unit | MPH |
| Velocity Value | 123 |
| Velocity Type | VYR |
| Velocity Unit | KMH |
| Velocity Value | 25 |

Contacts

| | |
|---|---|
| Name | John Doe |
| Phone Number | +15555555557 |
| Note | Primary |

FIG. 21

APPARATUS AND METHOD FOR COMMUNICATION BETWEEN AN EMERGENCY CALLER AND AN EMERGENCY RESPONDER DEVICE

CROSS-REFERENCE TO RELATED APPLICATIONS

The present application claims priority to U.S. Provisional Patent Application No. 63/220,428, filed Jul. 9, 2021, entitled "Apparatus and Method For Communication Between An Emergency Caller and An Emergency Responder Device" which is hereby incorporated by reference herein in its entirety, and which is assigned to the same assignee as the present application.

FIELD OF THE DISCLOSURE

The present disclosure relates generally to emergency calls, enhanced 9-1-1 (E911) and next generation 9-1-1 (NG911) emergency networks, and more particularly, to receipt and provision of mobile device data for emergency calls.

BACKGROUND

Despite advances that have been made in emergency network technology, emergency networks remain relatively ill-prepared and have not technologically advanced in step with the needs for the determination of the location of mobile devices as well as non-landline devices in emergency situations. Additionally, because of ubiquitous, yet constantly evolving communication technologies and applications, emergency networks are bombarded with emergency communications from a plethora of non-homogeneous sources. Traditionally, emergency networks received voice calls from landline telephones via a public switched telephone network (PSTN) from which determining the caller and the caller's location was relatively straightforward because PSTN telephones were at fixed locations and associated with a given subscriber. The advent of wireless communication introduced additional complexities due to the mobility of callers. With the further advent of mobile Internet connectivity, which enables "over-the-top" voice-over-Internet-protocol (VoIP) and other messaging application communications, further challenges were introduced with respect to locating callers.

BRIEF DESCRIPTION OF THE DRAWINGS

FIG. 21 is an example of one possible data feed to an emergency responder device from an onboard automobile crash detection system in accordance with an example embodiment.

DETAILED DESCRIPTION

Figure 1:
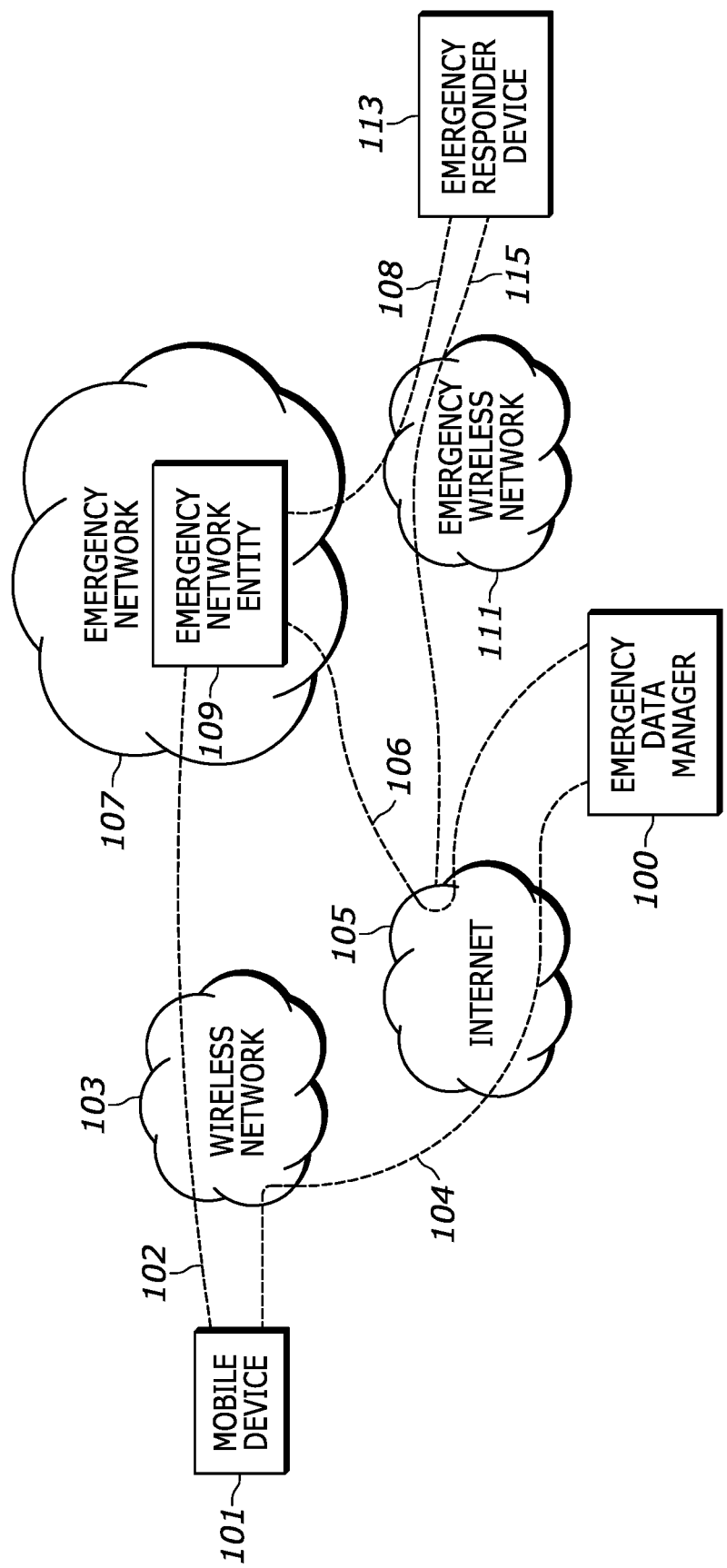
FIG. 1 is a diagram illustrating a mobile device in communication with an emergency network via a wireless network, and sending emergency data to an emergency data manager over the Internet, where the emergency network has an emergency network entity in communication with an emergency responder device in accordance with an example embodiment.

Briefly, the present disclosure provides an apparatus and methods for establishing an emergency call back call from a responder device to a mobile device that placed an emergency call, and for sending emergency data associated with the mobile device user to the emergency responder device. The emergency responder using the emergency responder device can see location updates, medical data, or other emergency data helpful to the emergency responder to assist the caller and provide the needed emergency assistance.

A disclosed method includes: sending emergency data from a cloud server to an emergency network entity, the emergency data received by the cloud server from a mobile device; sending a link to an emergency responder device located in proximity to a location of the mobile device in response to the emergency network entity receiving the emergency data; and establishing a data connection between the cloud server and the emergency responder device in response to selection input from the emergency responder device selecting the link. The method may further include establishing a data connection between the mobile device and the emergency responder device in response to selection input from the emergency responder device selecting the link.

Another disclosed method includes: sending emergency data from a cloud server to an emergency network entity where the emergency data is received by the cloud server from a mobile device; sending a link to an emergency responder device located in proximity to a location of the mobile device in response to the emergency network entity receiving the emergency data; and establishing a data connection between the mobile device and the emergency responder device in response to selection input from the emergency responder device selecting the link.

The method may further include: sending the link from the emergency network entity in response to receiving an emergency call from the mobile device subsequent to receiving the emergency data from the cloud server. The method may further include: sending the link from the cloud server in communication with the emergency network entity. The method may further include: establishing a second data connection between the emergency responder device and the cloud server, in response to selection input from the emergency responder device selecting the link; and sending updates of the emergency data to the emergency responder device from the cloud server. The method may further include: establishing a second data connection between the emergency responder device and the emergency network entity, in response to selection input from the emergency responder device selecting the link; and sending updates of the emergency data to the emergency responder device from the cloud server via the second data connection to the emergency network entity.

Sending a link to an emergency responder device located in proximity to the location of the mobile device, may include determining that the emergency responder device is in proximity to the location of the mobile device based on location data for the mobile device received from the cloud server.

Another disclosed method includes: receiving an emergency call from a mobile device at an emergency network entity; sending a link to an emergency responder device located in proximity to a location of the mobile device; and establishing a data connection between the mobile device and the emergency responder device in response to selection input from the emergency responder device selecting the link.

The method may further include: sending the link from the emergency network entity in response to receiving the emergency call from the mobile device. The method may further include: receiving emergency data from a cloud server prior to receiving the emergency call from the mobile device, the emergency data received by the cloud server from the mobile device. The method may further include: receiving, by the emergency network entity, emergency data from a cloud server, where the emergency data is associated with the mobile device used to place the emergency call; and sending the emergency data associated with the mobile device to the emergency responder device. The method may further include: establishing a second data connection between the cloud server and the emergency responder device, through the emergency network entity; and sending the emergency data to the emergency responder device over the second data connection.

Establishing a data connection between the mobile device and the emergency responder device in response to selection input from the emergency responder device selecting the link, may include establishing a voice-over-IP (VoIP) call between the mobile device and the emergency responder device.

The method may further include: establishing an IP connection between the emergency network entity and the emergency responder device; and sending emergency data to the emergency responder device from the emergency network entity.

Sending a link to an emergency responder device located in proximity to the location of the mobile device, may include determining that the emergency responder device is in proximity to the location of the mobile device based on location data for the mobile device received from a cloud server.

The method may further include: determining data access authorization of the emergency responder device based on a threshold distance of the emergency responder device from the location of the mobile device.

Another disclosed method includes: receiving emergency data from a cloud server at an emergency network entity, where the emergency data received by the cloud server is received from a mobile device; sending a link to an emergency responder device for an emergency responder dispatched to a location of the mobile device; and establishing a data connection between the cloud server and the emergency responder device in response to selection input from the emergency responder device selecting the link.

The method may further include: pushing the emergency data from the cloud server to the emergency responder device. The method may also include establishing a data connection between the mobile device and the emergency responder device in response to selection input from the emergency responder device selecting the link. The data connection between the mobile device and the emergency responder device may enable a voice-over-Internet-protocol call between the mobile device and the emergency responder device.

Turning now to the drawings, FIG. 1 is a diagram illustrating a mobile device 101 in communication with an emergency network 107 via a wireless network 103, and sending emergency data 104 to an emergency data manager 100 over the Internet 105. The emergency network 107 includes at least one emergency network entity 109 which may be a call handling system, a computer aided dispatch system or a combination of both. The mobile device 101 sends emergency data 104 via an Internet 105 connection to an emergency data manager 100. The emergency data manager 100 provides, among other things, a software-as-a-service (SaaS) application to various emergency networks 107 and to various emergency responder devices 113 such that one or more emergency network entity 109 within an emergency network 107 may execute an instance of the SaaS application. Likewise, one or more emergency responder devices 113 may execute a mobile friendly instance of the SaaS application provided by the emergency data manager 100. Each instance of the SaaS application may be executed using a web browser on an emergency network entity 109 or on an emergency responder device 113 having at least one websocket connection established with the emergency data manager 100. The wireless network 103 provides the mobile device 101 with Internet 105 connectivity such that it may establish Internet Protocol (IP) connections with various Internet-based services such as software-as-a-service (SaaS) platforms including the emergency data manager 100. In the case of emergency data 104, the mobile device 101 sends emergency data 104 based on the mobile device 101 establishing an IP based emergency session or placing an emergency call 102. The mobile device 101 may send some types of emergency data 104 in response to having initiated an emergency call or emergency session. However, the mobile device 101 may also send some types of data that may be relevant to an emergency, to various databases on a regular basis such as at a set time or at a set interval. Such data may become emergency data if needed and may include, for example, health or medical data, sensor data, etc. To seek assistance from the emergency network 107, the mobile device 101 user may also send an emergency short-message-service (SMS) message to the emergency network 107 which also travels via the wireless network 103 and SMS infrastructure.

For emergency calling via the wireless network 103, an emergency call 102 is placed using the native dialer of the mobile device 101 and is routed via emergency call routing network pathways to the emergency network 107. In this example, the emergency call 102 would be routed to the emergency network 107 utilizing Centralized Automatic Message Accounting (CAMA) trunks and Signaling System No. 7 (SS7), etc. The emergency network entity 109 may obtain some associated location information for the emergency caller by making a query to an Automatic Location Information (ALI) database. The emergency network entity 109 uses a mobile device identifier such as that obtainable via out-of-band signalizing over the CAMA trunks that provides automatic number identification (ANI) or pseudo ANI assigned to a wireless emergency call by the wireless network 103. For wireless networks such as wireless network 103, the ALI data is large range location such as the radio base station antenna tower location that received the emergency call. The large range location information is not sufficient for dispatching emergency responders because it does not provide a precise location for the mobile device that placed an emergency call.

The operator/dispatcher handling the emergency call 102 at the emergency network entity 109 receives accurate location from the emergency data manager 100 based on the emergency data 104. The emergency data 104 includes at least location data where the location data may be generated by the mobile device 101 such as by radio triangulation with assistance from the wireless network 103, obtained from the mobile device 101 GPS chipset, or a combination of these and other location data which is referred to as hybrid location data. Other data related to the emergency may also be included in the emergency data 104 such as, but not limited to, medical information related to the mobile device 101 user, or other information. The emergency data manager 100 is operative to obtain these various types of emergency data 104 from the mobile device 101 independently from the emergency network 107 and independently from emergency call routing to the emergency network 107. In other words, the emergency data 104 provides location information to the emergency network entity 109 independently of ALI data and independently from emergency call routing and ANI data.

The emergency data manager 100 maintains a persistent IP connection 106 to the emergency network entity 109 and is operative to push emergency data 104, or send the emergency data 104 as streaming data, to the emergency network entity 109 over the Internet 105 as the emergency data 104 is received by the emergency data manager 100 from the mobile device 101, or from other sources such as, but not limited to, databases. This information is available at the emergency network entity 109, in most cases, prior to the emergency call actually being answered at the emergency network 107. For example, the emergency data manager 100 receives location data that the mobile device 101 generates and sends to the cloud. When the mobile device 101 initiates an emergency call, the mobile device 101 sends its location information to a server, which is then obtained by the emergency data manager 100. The emergency data manager 100 then provides the location information to the emergency network entity 109 along with a device identifier for mobile device 101, such as a telephone number or other identifier. This process may occur prior to completion of call routing of the 9-1-1 call through the wireless network 103. Therefore, the emergency network entity 109 may obtain knowledge of the emergency prior to it receiving the incoming emergency call.

After emergency call routing of the emergency call 102 is completed, and the emergency call 102 is answered by the emergency network 107, a dispatcher may begin dispatch operations to send emergency responders to the caller's location, i.e. the location of the mobile device 101. In situations where the emergency call 102 is not received, but the emergency network entity 109 has information from the emergency data manager 100 that an emergency call was attempted, the dispatcher may still dispatch emergency responders. During dispatch operations by the emergency network 107, an operator may use the emergency network entity 109 to establish a communication link 108 with an emergency responder device 113 via an emergency wireless network 111. The emergency wireless network 111 may be a proprietary network, or in some cases, may utilize one or more of wireless network such as wireless network 103 which is a commercial wireless network. However, the emergency wireless network 111, may be a nationwide wireless broadband network dedicated to public safety use.

At the emergency network entity 109, as emergencies are handled, a unique identifier, which may be referred to as an "incident ID" is assigned to the specific emergency. This unique identifier is conveyed to the emergency responder device 113 during dispatch operations. The unique identifier is used by the emergency network entity 109 to further convey a link to the emergency responder device 113. The link may be conveyed to the emergency responder device 113 in a variety of ways, for example, sent via SMS, sent as an HTTP message, etc. and may include a WebRTC link. The emergency responder device 113 may be a smartphone, laptop computer, tablet, or other type of wireless communication device that includes a display, user interface, etc. and that may access various wireless networks and obtain Internet connectivity. The emergency responder device 113 may have multiple radio transceivers such that it may access multiple wireless networks or utilize multiple wireless technologies conjointly, such as a wireless LTE network, 5G network, and an 802.11 (WiFi™) network, Bluetooth™, etc. without limitation.

The emergency network entity 109 may establish a communication link 108 with the emergency responder device 113 and may provide the emergency data 104, or subsets of the emergency data 104, as needed or necessary for the emergency responder operating the emergency responder device 113 to properly respond to the specific emergency. For example, a police officer may require location information and a paramedic may require location information and medical information, etc. The location data may include, but is not limited to, Android Mobile Location (AML) data, Android Emergency Location Service (ELS) data, and Hybridized Emergency Location (HELO) data provided by iOS™ devices. Other data, "additional data" may include, but is not limited to, medical data, map data, etc. The emergency responder device 113 may also establish Internet connectivity 115 using a wireless network such as the emergency wireless network 111, the commercial wireless network 103, or both. In some embodiments, the emergency responder device 113 may be given access directly to the emergency data manager 100 via an SMS, or an HTTP message, etc. which may include a WebRTC link. In one example, the link may open a web browser window on the emergency responder device 113 and display a mobile friendly web based graphical user interface, representing an instance of a software-as-a-service (SaaS) application provided by the emergency data manager 100. The web browser window displayed on the emergency responder device 113 may display emergency data such as, but not limited to, location, medical information, call information, etc., that assists the emergency responder in handling the emergency.

Figure 2:
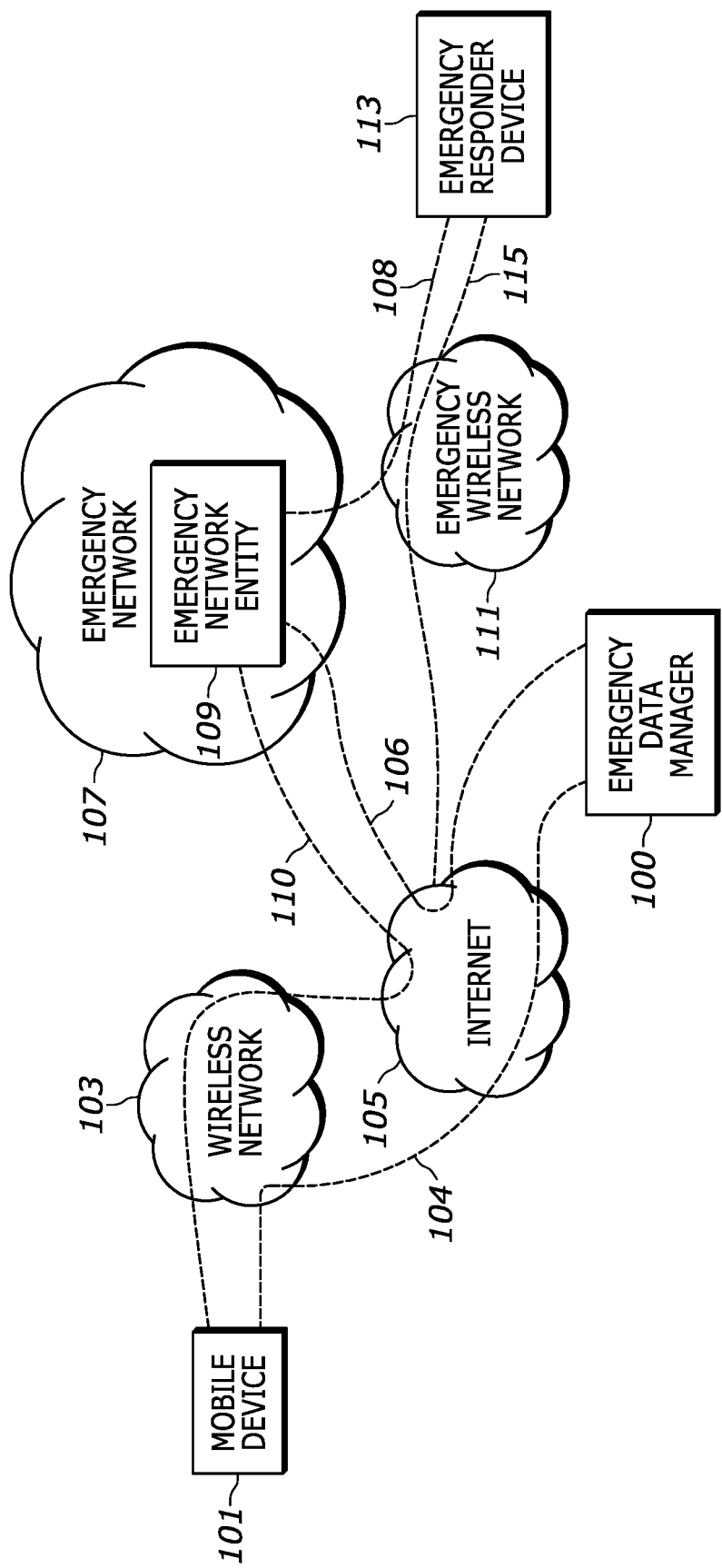
FIG. 2 is a diagram illustrating a mobile device in communication with an emergency network via an Internet connection, and sending emergency data to an emergency data manager over the Internet, where the emergency network has an emergency network entity in communication with an emergency responder device in accordance with an example embodiment.

In FIG. 2, the mobile device 101 establishes an emergency session 110 with the emergency network 107 and is connected with the emergency network entity 109 through an Internet 105 connection provided by the wireless network 103. The emergency session 110 may be facilitated as a voice-over-IP (VoIP) phone call using an "over-the-top" application and for example, Session Initiation Protocol (SIP) to place an IP emergency call to the emergency network 107. The mobile device 101 emergency data 104 is also sent to the emergency data manager 100 as in the example shown in FIG. 1. The emergency data manager 100 pushes or streams the emergency data 104 to the emergency network entity 109 over the persistent IP connection 106 also similar to the example shown illustrated in FIG. 1. The emergency session 110 may also be facilitated using a text messaging application that uses SMS infrastructure, or via some other messaging application that utilizes the wireless network 103 Internet connectivity to communicate from the mobile device 101 to the emergency network entity 109.

In the examples illustrated in FIG. 1 and in FIG. 2, the emergency network entity 109 may provide a link, such as an HTTP URL link, a WebRTC link, etc. to the emergency responder device 113 via the communication link 108. By selection of the link, the emergency responder device 113 may establish a call, data session or both, directly with the mobile device 101, and may also access a web browser page displaying an instance of the SaaS application provided by the emergency data manager 100. The link may be sent to the emergency responder device 113 via an Internet push operation, an SMS message, an IM message, or on a side band control channel of a voice call, etc. Using a web browser, or in some embodiments a mobile application executing on the emergency responder device 113, the emergency responder device 113 may also establish an IP connection with the emergency data manager 100 to receive emergency data 104 directly. The web browser for example may use Internet connectivity 115 and a websocket connection to the SaaS application provided by the emergency data manager 100.

Figure 3:
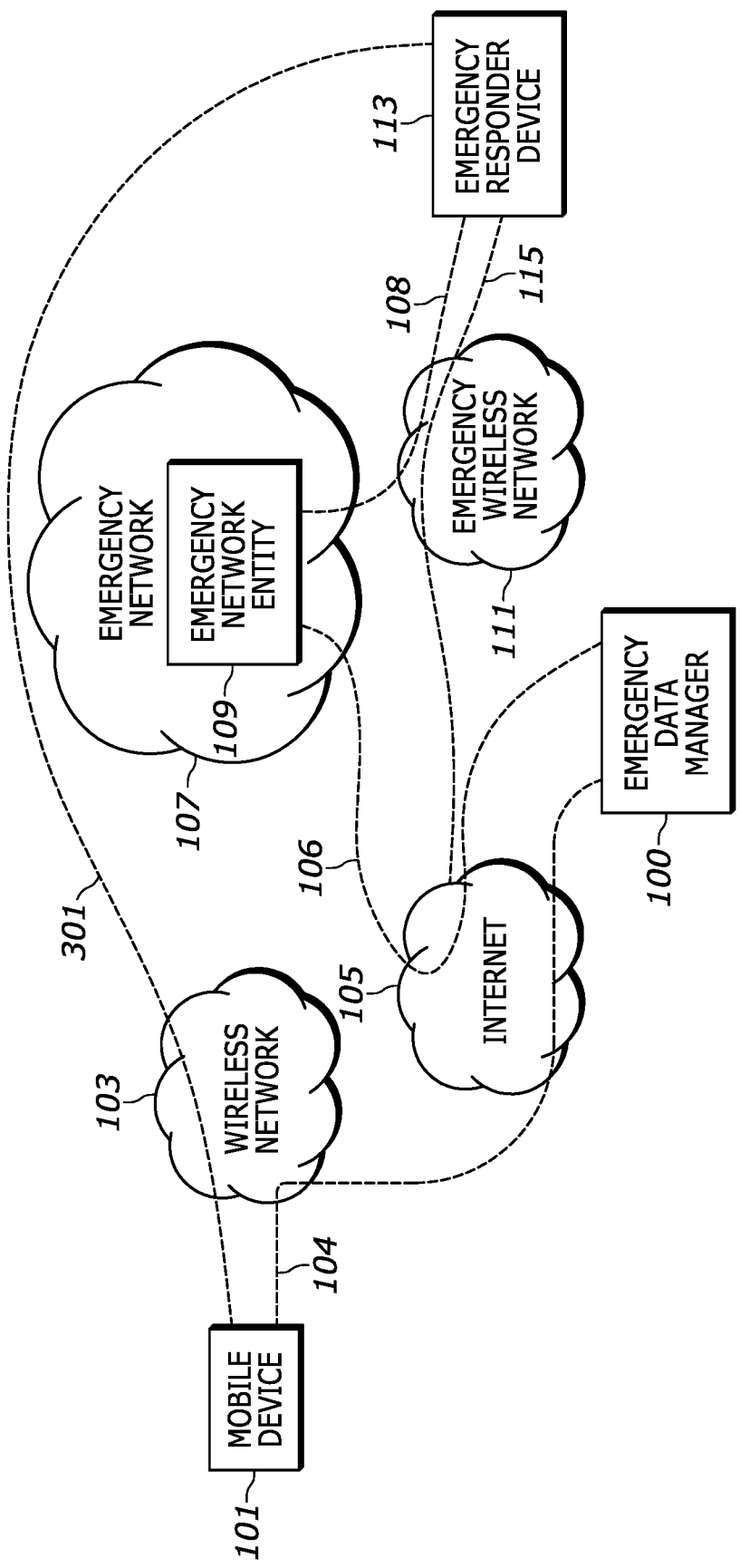
FIG. 3 is a diagram illustrating a mobile device in communication with an emergency responder device via a wireless network, and sending emergency data to an emergency data manager over the Internet, where the emergency network has an emergency network entity in communication with an emergency responder device in accordance with an example embodiment.

FIG. 3 illustrates an example scenario in which case, the emergency responder device 113 user may select the HTTP URL link, WebRTC link etc. and establish a communication link 301 directly between the mobile device 101 and the emergency responder device 113. In this example, the link does not show the mobile device 101 telephone number on the emergency responder device 113 but places the call using an application on the emergency responder device 113. The call may be placed as a wireless phone call through the wireless network 103. In other implementations, such as by using a WebRTC link, the mobile device 101 leg of the communication link 301 may be facilitated by the wireless network 103 Internet connectivity, while the emergency responder device 113 leg of the communication link 301 may be facilitated by Internet connectivity provided by either the wireless network 103 or by Internet connectivity 115 provided by the emergency wireless network 111. In that case, the emergency communication link 301 may be established as an IP-based emergency "call back" call from the emergency responder device 113 to the mobile device 101. The emergency data manager 100 continues to receive emergency data 104 from the mobile device 101 which in turn is provided to the emergency responder device 113 either by the emergency network entity 109 through the communication link 108, or via the emergency response device 113 having its own connection to the emergency data manager 100 SaaS application. In implementations in which the emergency responder device 113 receives emergency data 104 from the emergency data manager 100, it may do so by running a mobile friendly instance of an SaaS application with a graphical user interface window provided by the emergency data manager 100 within a web browser. In that case, the emergency responder device 113 may execute the web browser with a websocket connection over the Internet 105 to the emergency data manager 100. The mobile friendly version of the SaaS GUI may be tailored to display information relevant to the emergency responder, but not the full SaaS GUI that is presented to call takers and dispatchers on the emergency network entity 109.

Figure 4:
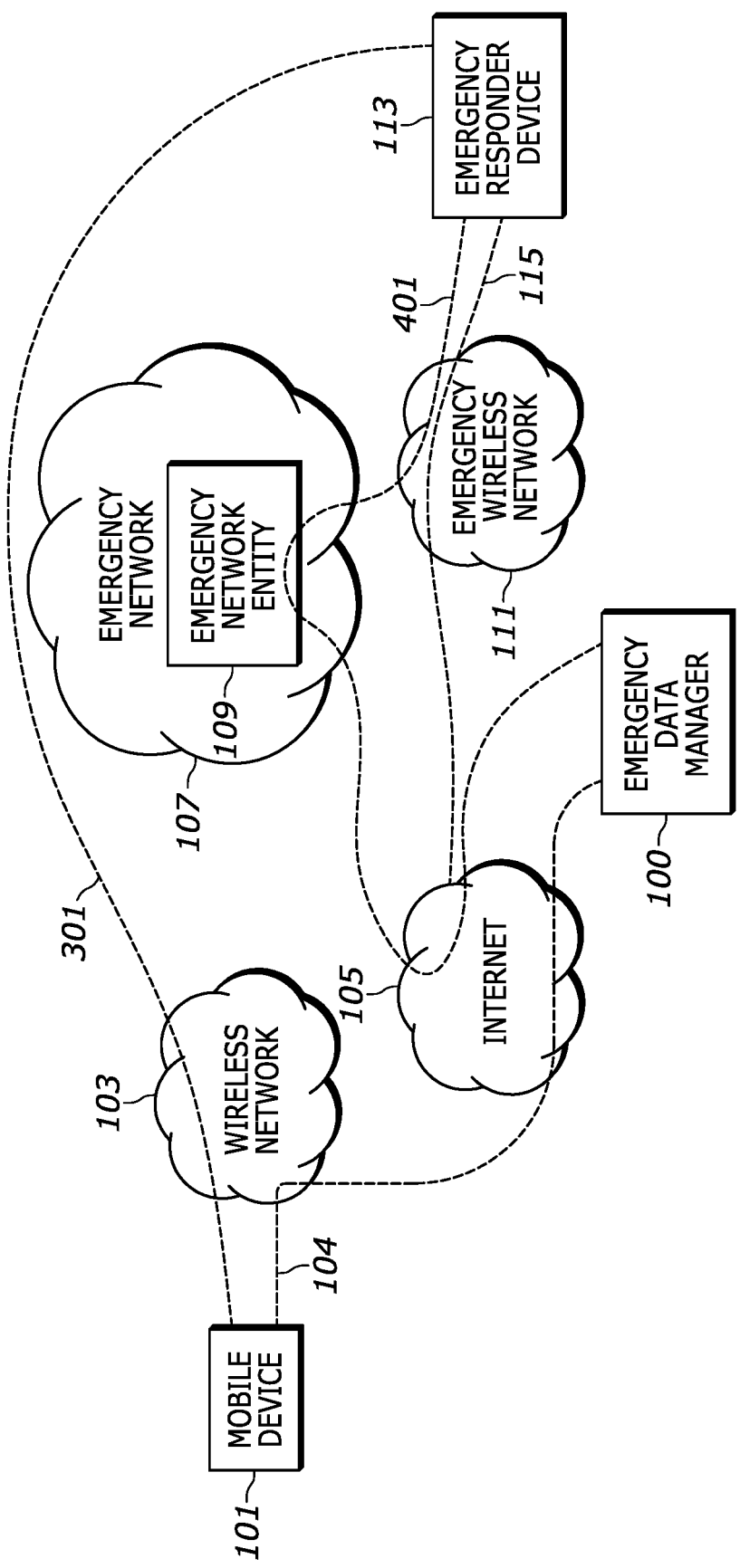
FIG. 4 is a diagram illustrating a mobile device in communication with an emergency responder device via a wireless network, and sending emergency data to an emergency data manager over the Internet, where the emergency network has an emergency network entity in communication with an emergency responder device to send emergency data to the responder device from the emergency data manager in accordance with an example embodiment.

FIG. 4 illustrates how the emergency data 104 may be provided to the emergency responder device 113 by the emergency data manager 100 via a separate data connection 401, in conjunction with the communication link 301. In the example shown in FIG. 4, the data connection 401 is facilitated by the emergency network entity 109 and both the operator of the emergency network entity 109 and the emergency responder operating the emergency responder device 113 are able to view the emergency data 104 including updates as they are received. The emergency responder device 113 receives data via the Internet 105 and is provided Internet connectivity 115 by the emergency wireless network 111. The data connection 401 is shown in FIG. 4 as passing through the emergency network entity 109 because the same emergency data is displayed at both the emergency network entity 109 and the emergency responder device 113. The emergency network entity 109 maintains an IP network connection, such as a web socket connection, to the emergency data manager 100, and the emergency responder device maintains an IP network connection, such as a web socket connection, to the emergency network entity 109. In one specific example, the emergency network entity 109 executes and displays a GUI associated with a computer-aided-dispatch (CAD) software, and the CAD software includes an integration of emergency data from the emergency data manager 100. The CAD software may then provide emergency data from the integration to the emergency responder device 113 using an interface between the CAD software and the emergency responder device 113 via a mobile application, an SaaS implementation, etc.

The data connection 401 is established with the emergency data manager 100 via the Internet 105 and through the emergency network entity 109 and the emergency wireless network 111, where the data connection 401 is over Internet connectivity 115 and interfaces with the emergency responder device 113 to provide emergency data 104 to the emergency responder device 113. The link provided to the emergency responder device 113 via the emergency network entity 109 may also facilitate establishment of the data connection 401. Therefore, the emergency data manager 100 may provide the emergency data 104 indirectly to the emergency responder device 113 by way of the emergency network entity 109 (and a CAD software integration as described above), and the emergency responder device 113 is operative to display the emergency data 104 on a graphical user interface provided on the display of the emergency responder device 113. The emergency data 104 may include location data or other emergency data information useful for the user of the emergency responder device 113 to respond to the emergency.

Figure 5:
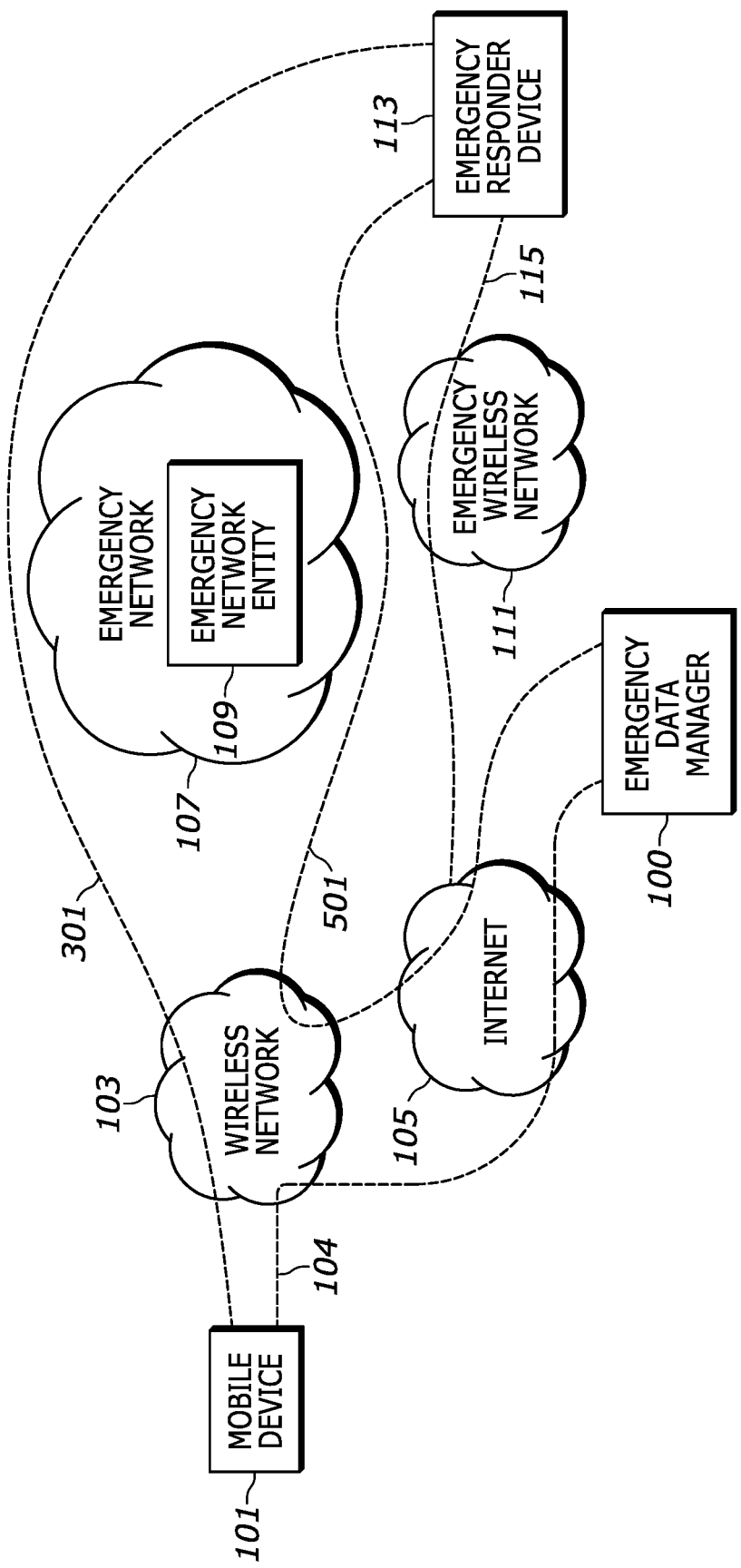
FIG. 5 is a diagram illustrating a mobile device in communication with an emergency responder device via a wireless network, and sending emergency data to an emergency data manager over the Internet, where the emergency responder device also receives the emergency data over the Internet in accordance with an example embodiment.

In the example of FIG. 5, the emergency responder device 113 is operative to establish data connection 501 which is a direct, persistent Internet connection with the emergency data manager 100 using wireless network 103 provided Internet connectivity. However, the emergency responder device 113 may also use Internet connectivity 115 via the emergency wireless network 111 alternatively to the wireless network 103 or redundantly in conjunction with the wireless network 103. The data connection 501 in this example is provided by the emergency data manager 100 directly to the emergency responder device 113 in that it is established without any interaction with the emergency network entity 109. An IP web socket connection may be present between the emergency data manager 100 and the emergency responder device 113 in this example. The emergency responder device 113 may execute a mobile application, or may use a web browser, either of which may establish a web socket connection to the emergency data manager 100 which hosts an application such as the SaaS application described above. The data connection 501 may be facilitated by a link, such as a WebRTC link provided to the emergency responder device 113 by the emergency network entity 109 as discussed in the previous examples. When the user of emergency responder device 113 selects the link, the web socket connection to the emergency data manager 100 is established, and emergency data 104 along with relevant updates are pushed to a GUI on the emergency responder device 113. The GUI may be a mobile friendly GUI and may represent an instance of the SaaS application hosted by the emergency data manager 100.

Figure 6:
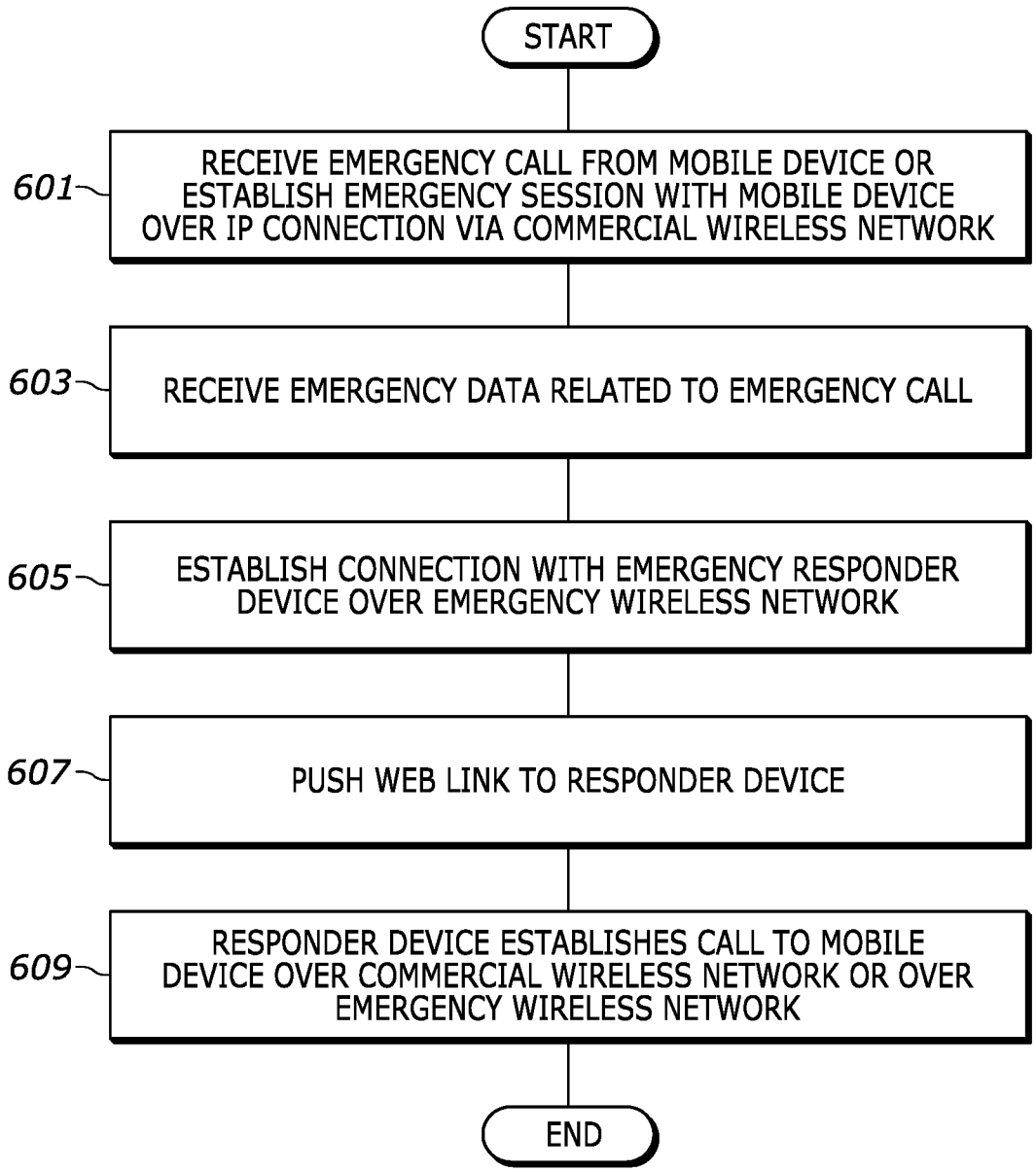
FIG. 6 is a flowchart of a method of operation in accordance with various embodiments.

FIG. 6 provides a flow chart for an example method of operation in accordance with an embodiment. The method of operation begins, and in operation block 601, the emergency network entity 109 receives emergency call 102 from the mobile device 101 or otherwise establishes emergency session 110 over an IP connection via a commercial wireless network 103. The emergency network entity 109 also receives emergency data 104 from the emergency data manager 100 related to the emergency call 102 as shown in operation block 603. In operation block 605, emergency network entity 109 establishes a connection with the emergency responder device 113 over the emergency wireless network 111 which may be a proprietary network such as a nationwide wireless broadband network dedicated to public safety use, or other type of proprietary network. In operation block 607, the emergency network entity 109 pushes a link, such as a WebRTC link, to the responder device 113. In operation block 609 the responder device 113 provides selection input selecting the link and, in response to selection input to the link, an IP based call back call to the mobile device 101 is established over the Internet and using one or more wireless networks for Internet connectivity. The mobile device 101 uses the commercial wireless network for its Internet connectivity. The method of operation then terminates as shown.

Figure 7:
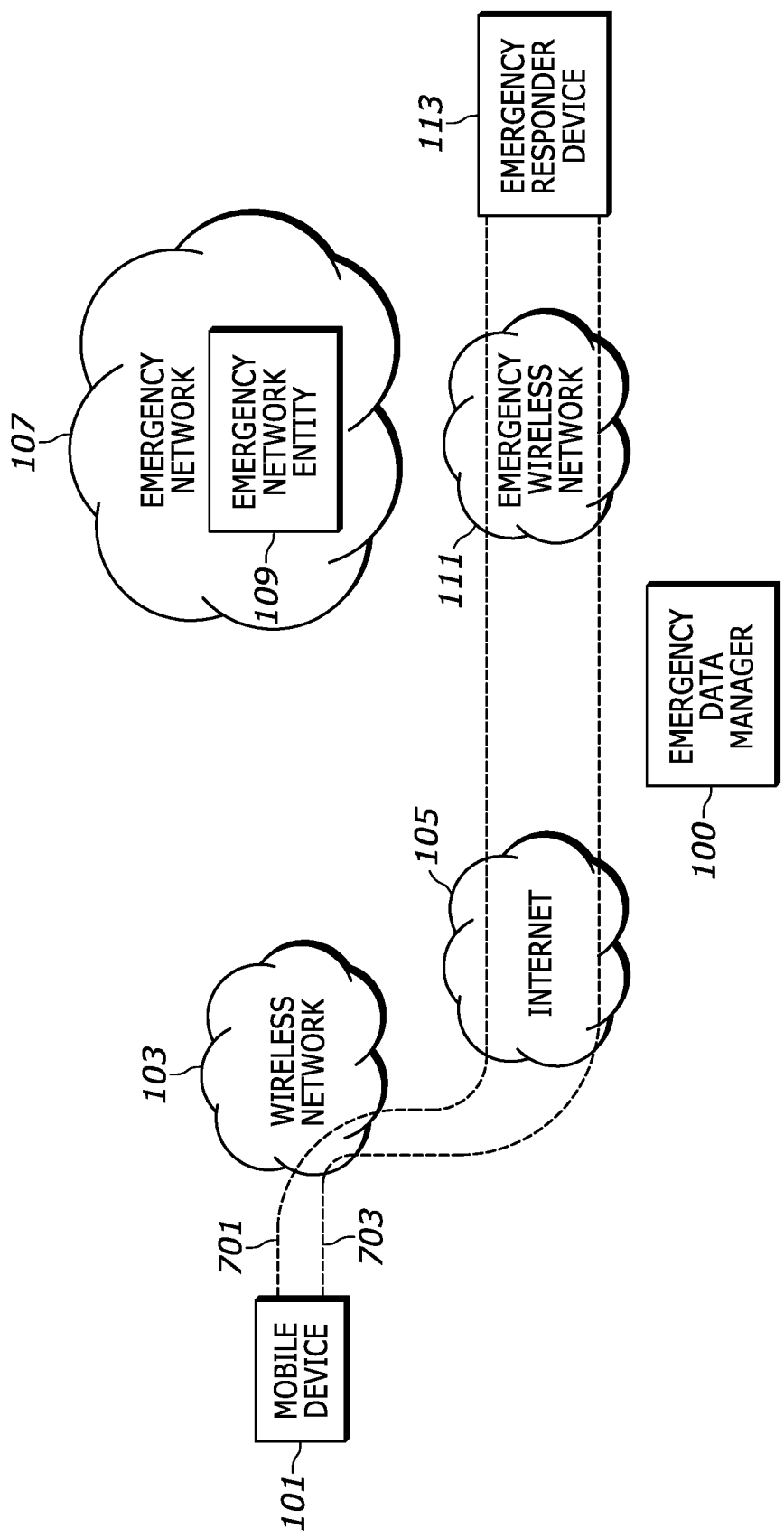
FIG. 7 is a diagram illustrating a mobile device in communication with an emergency responder device via the Internet for voice communication and to send emergency data to the emergency responder device in accordance with an example embodiment.

FIG. 7 provides another example in which the emergency responder device 113 is operative to establish both an IP emergency data session 703 and an IP based emergency call back call 701 directly to the mobile device 101. In this case the emergency callback call 701 is established by the commercial wireless network 103 and through the Internet 105 for the mobile device 101 leg of the call, and by the emergency wireless network 111 and the Internet 105 for the emergency responder device 113 leg of the call. The scenario illustrated in FIG. 7 can occur after receiving an emergency call 102 or establishing an emergency session 110 between the mobile device 101 and the emergency network entity 109. The link provided to the emergency responder device 113, once selected by the emergency responder device 113 user, may automatically facilitate the callback call 701, data session 703, or both, directly between the emergency responder device 113 and the mobile device 101. The data connection 703 is provided to a graphical user interface GUI of the emergency responder device 113.

Figure 8:
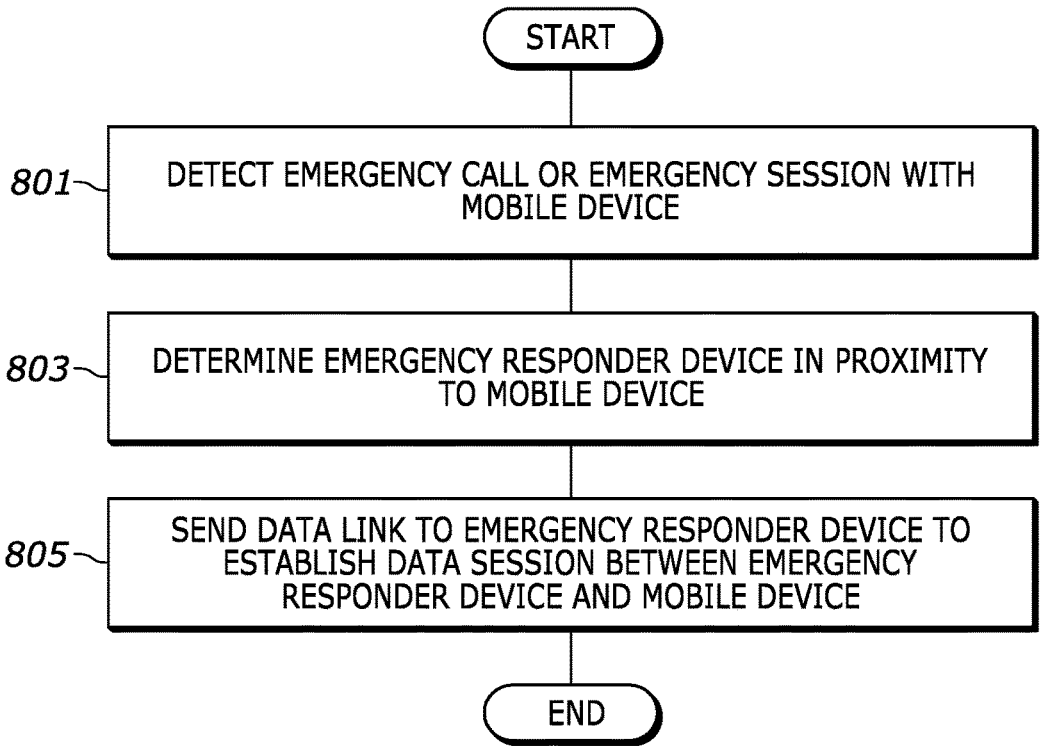
FIG. 8 is a flowchart of a method of operation in accordance with various embodiments.

FIG. 8 is a flow chart of a method of operation in accordance with various embodiments. The method of operation begins and in operation block 801, the emergency data manager 100 detects that an emergency call 102 or emergency session 110 has been initiated by the mobile device 101 and received emergency data 104 including, but not limited to, location data. The emergency data manager 100 may detect the emergency call 102 or emergency session 110, by way of receiving the emergency data 104 associated with a device identifier of the mobile device 101.

In operation block 803, the emergency data manager 100 communicates with the emergency network entity 109 and, in some embodiments, determines an emergency responder device 113 in proximity to the mobile device 101. In other embodiments, a dispatcher operating the emergency network entity 109 determines the emergency responder device 113 in proximity. In operation block 805, the emergency network entity 109 sends a link to the emergency responder device 113 to establish a data session between the emergency responder device 113 and the mobile device 101. The method of operation then terminates as shown. If at any time the connection to the responder device 113 is lost, the method of operation begins again to reestablish the data session with the mobile device 101.

Figure 9:
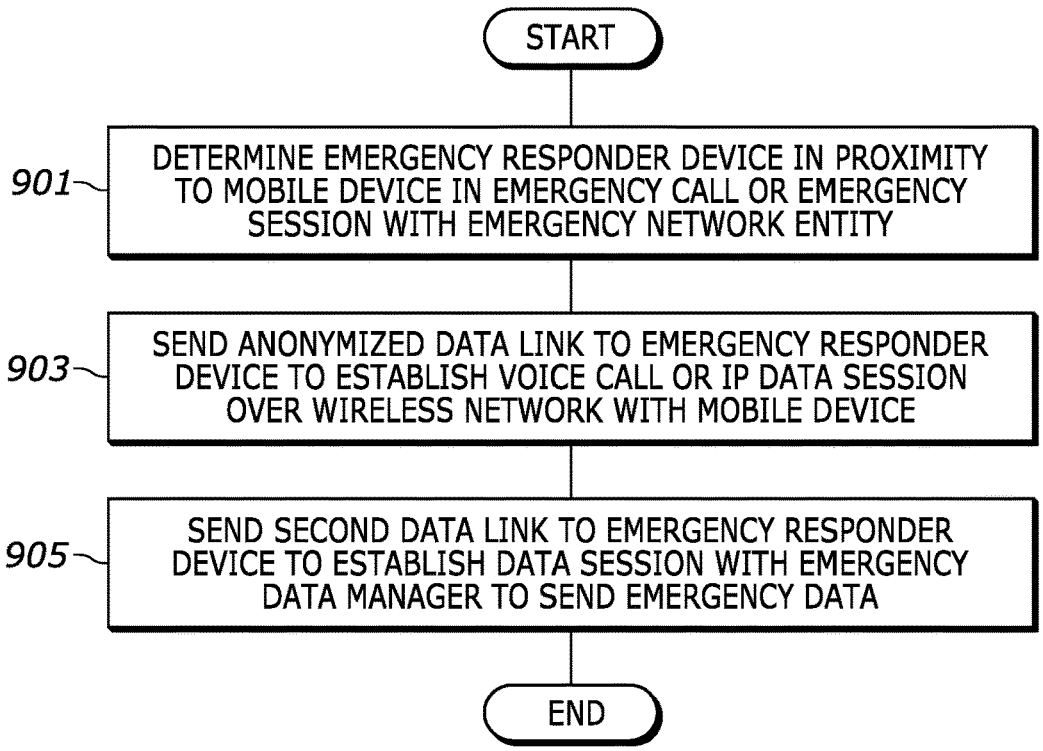
FIG. 9 is a flowchart of a method of operation in accordance with various embodiments.

FIG. 9 is a flow chart of a method of operation in accordance with various embodiments. The method of operation begins and, in operation block 901, the emergency network entity 109 determines an emergency responder device 113 that is in proximity to the mobile device 101 when an emergency call 102 or emergency session 110 has been established between the mobile device 101 and emergency network entity 109. In operation block 903, the emergency data manager 100 sends in an anonymized data link to the emergency responder device 113 to establish an IP voice call or IP data session over the Internet with the mobile device 101. In operation block 905, the emergency data manager 100 sends a second link to the emergency responder device 113 to establish a data session with the emergency data manager 100 such that emergency data 104 can be sent directly to the emergency responder device 113. The method of operation then terminates as shown.

Figure 10:
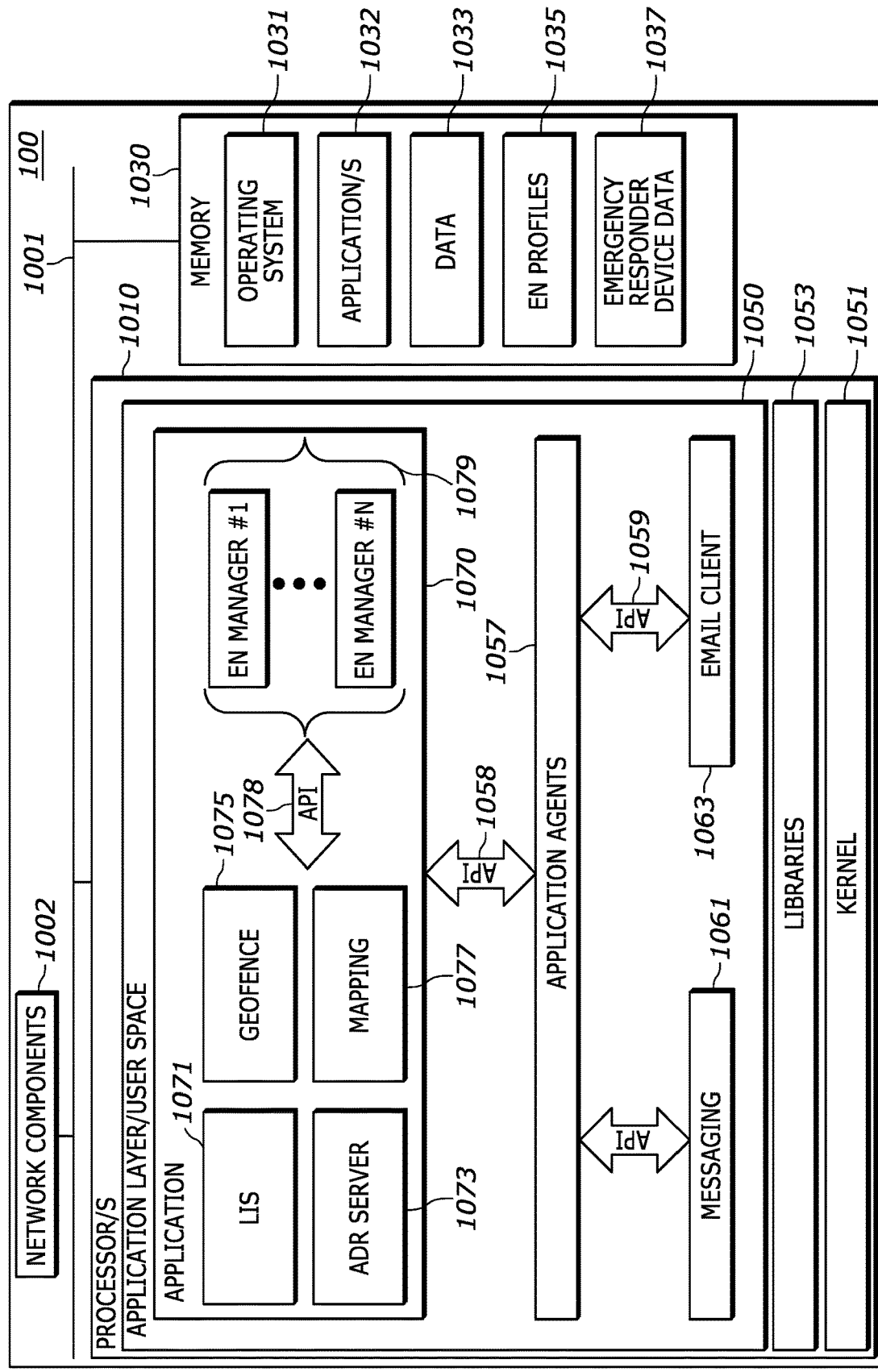
FIG. 10 is a diagram of an example emergency data manager in accordance with some embodiments.

FIG. 10 provides an example implementation of the emergency data manager 100. The emergency data manager 100 includes network components 1002, at least one processor 1010, and at least one non-volatile, non-transitory memory 1030 in addition to RAM (random access memory). The network components 1002 may include one or more network transceivers for Ethernet connectivity to other network entities and an Internet connection. The memory 1030 stores executable instructions and data such as e operating system executable instructions 1031 and application executable instructions 1032 for various applications. The memory 1030 also stores data 1033 which may provide a location and geofence data cache, other data caches and other data, etc.

The processor 1010 may be implemented as one or more microprocessors, ASICs, FPGAs, microcomputers, microcontrollers, digital signal processors, central processing units, state machines, logic circuitries, and/or devices that manipulate signals based on operational instructions. Among other capabilities, the processor 1010 is configured and operative to fetch and execute computer-readable instructions (i.e. executable instructions) stored in the memory 1030. For example, the operating system 1031 executable instructions, when executed by the at least one processor 1010, may provide a kernel 1051, libraries 1053 (i.e. application programming interfaces or "APIs"), an application layer 1050 or "user space" within which the various applications are executed, and an IP protocol stack 1055. The application executable instructions 1032, when executed by the at least one processor 1010, enable data retrieval and data ingestion operations, a Location Information Server (LIS) 1071, an ADR server 1073 a geofence module 1075, a mapping module 1077, and one or more emergency network managers 1079. Emergency network profiles 1035, stored in memory 1030, may be accessed by the various modules and the emergency network managers 1079 to access information needed to communicate with various emergency networks. The emergency network managers 1079 communicate with the other modules of application 1070 via a set of APIs 1078.

The processor 1010 may further execute a set of application agents 1057 which communicate with the application 1070 via APIs 1058. The application agents 1057 in turn are operative to, among other things, provide API communication between the various other applications executing in the application layer 1050, such as a messaging client 161 and an email client 1063. Each application may have a related API. For example, the email client 1063 may communicate with the application agents 1057 via API 1059.

The emergency data manager 100 may be implemented as a cloud server. The term "cloud server" as used herein, refers to a server, accessible by an Internet connection, that is operative to host one or more applications that may be accessed by a computing device using a web browser or an application resident on the computing device. One type of computing device that may access the applications is an emergency network entity such as, but not limited to, a workstation. The emergency data manager 100 is operative to provide a cloud-based application such as a software-as-a-service (SaaS) application accessible remotely using a computer or workstation connected to the Internet and operatively coupled to the emergency data manager 100. The emergency data manager 100 may be implemented as SaaS software executed using a platform-as-a-service (PaaS) that enables development and execution of cloud-based applications. Some or all of the emergency data manager 100 functions may be distributed functions that are distributed on multiple servers in order to increase availability and redundancy in the SaaS environment. The emergency data manager 100 may also provide a SaaS application accessible using an emergency responder device 113 which may be a smartphone, laptop computer, tablet computer, or other device etc. capable of wireless Internet access. Emergency responder device data 1037 stored in memory 1030 may include login credentials for emergency responder devices that are authorized to establish an IP connection with the emergency data manager 100 via a web browser or client-side application executing on the specific emergency responder device.

All of the components of the emergency data manager 100 are operatively coupled by an internal communication bus 1001. As used herein, components may be "operatively coupled" when information can be sent between two such components, even though there may be one or more intermediate or intervening components between, or along the connection path. Therefore, any of the various components with the emergency data manager 100, and in other example network entities and devices described herein, may be understood herein to be operatively coupled to each other where appropriate, and to be executing on one or more processors that are further operatively coupled to a memory that stores executable instructions (also referred to as "software code" or "code") for implementing the various components. Operative coupling may also exist between engines, system interfaces or components implemented as software or firmware executing on a processor and such "software coupling" may be implemented using libraries (i.e. application programming interfaces (APIs)) or other software interfacing techniques as appropriate. Such libraries or APIs provide operative coupling between various software implemented components of FIG. 10. A "module" as used herein may be a software component. A "server" as used herein may be a software component or a combination of hardware and software. In the example emergency data manager 100 shown in FIG. 10, the LIS 1071, ADR server 1073, geofence module 1075, mapping module 1077, and one or more emergency network managers 1079 are all operatively coupled to each other via APIs 1078 and are operatively coupled to the IP protocol stack 1055 and to the application agents 1057 via APIs 1058.

All of the servers, components and modules described herein may be implemented as software or firmware (or as a combination of software and firmware) executing on one or more processors, and may also include, or may be implemented independently, using hardware such as, but not limited to, ASICs (application specific integrated circuits), DSPs (digital signal processors), hardwired circuitry (logic circuitry), or combinations thereof That is, any of the components or modules disclosed herein may be implemented using an ASIC, DSP, FPGA executable instructions executing on a processor, logic circuitry, or combinations thereof. In other words, the components and modules may be implemented as hardware, software or by combinations thereof. Therefore, each of the servers, components and modules disclosed herein may be considered a type of apparatus that may be implemented and operate independently from the other components in the system. For example, any one of the LIS 1071, ADR server 1073, geofence module 1075, mapping module 1077, or emergency network managers 1079 may be implemented using an ASIC, DSP, FPGA, executable instructions executing on a processor, logic circuitry, or combinations thereof.

The various embodiments also include computer readable memory that may contain executable instructions, for execution by at least one processor, that when executed, cause the at least one processor to operate in accordance with the emergency data manager 100 and other functionality herein described. The computer readable memory may be any suitable non-volatile, non-transitory, memory such as, but not limited to, solid-state storage (SSS), programmable chips such as EEPROMS, flash ROM (thumb drives), compact discs (CDs) digital video disks (DVDs), optical drives, etc., that may be used to load executable instructions or program code to other processing devices or electronic devices such as those that may benefit from the features and methods of operation herein described. The executable instructions may also include the various operating system environments and the kernel. For example, the memory 1030, which is a non-volatile, non-transitory memory, may store executable instructions for execution by the at least one processor 1010 that when executed, provide the LIS 1071, ADR server 1073, geofence module 1075, mapping module 1077, or emergency network managers 1079.

In some implementations, the emergency data manager 100 is operatively coupled to a geofence database which stores jurisdictional boundary data for various emergency networks as well as for the national or regional emergency networks. The emergency data manager 100 is operative to store and retrieve emergency data from the various databases, and may function as an interface between emergency networks, the various databases and mobile devices to receive and store emergency data. The stored emergency data can be transmitted or distributed to emergency networks and emergency responder devices before, during, or after emergencies. The emergency data manager 100 may receive emergency data from any of the mobile devices and such data may include, but is not limited to, locations, medical history, personal information, or contact information.

The emergency data manager 100 is operative to perform operations that include data ingestion and data retrieval. The emergency data manager 100 is operative to perform data ingestion by communication with various databases to obtain emergency data. The LIS 1071 can perform location ingestion and supports interfaces operative to post or receive emergency locations. The LIS 1071 may perform location ingestion using a REST API that is operative to receive an HTTP POST including location data when an emergency alert is generated or when an emergency call is received from a device or from another server or database to which a device has sent its location information. The location data may include a location generated concurrently or in response to the generation of the emergency alert, which may initiate an emergency call or emergency session for requesting emergency assistance. This generated location data may be, for example, location data from a device GPS chipset, such as GPS coordinates, or mobile device generated location data that is calculated by algorithms operating on the mobile device such as, but not limited to, triangulation. This data may also include data from a device inertial-measurement-unit (IMU). The location data may be generated before an emergency alert such as, for example, when a medical bracelet IMU detects that a patient has fallen. In another example, when an emergency call is made from a device, the LIS 1071 may receive a location recently generated by the device GPS chipset, or by a device triangulation algorithm, or other device location mechanism, thereby ensuring that a location for the emergency is available as quickly as possible. The location data may include a device-based hybrid location generated by a device which has sent an emergency alert where the hybrid location data includes GPS data or is a combination of location determinations using one or more algorithms or one or more algorithms plus GPS data. A GPS chipset within the device may generate the location data. The location data may also include a location data generated by a second device that is communicatively coupled to the device that sent the emergency alert. For example, a wearable device such as a medical bracelet or smartwatch, that does not include location capabilities, may use the location services location from a mobile phone with which it is paired. The LIS 1071 may communicate with a device via a mobile application installed on the device or via firmware or an operating system of the device.

The location data generated by a device prior to an emergency occurrence may be accessible by an authorized (based on device location) emergency network during an emergency. For example, a taxi company may have software that transmits the location of its cars or assets to the emergency data manager 100, or another server, preemptively. Thus, when an emergency arises, the location of the affected taxi can be made accessible quickly to send for help. Further, location data generated by a device after an emergency has commenced may be made accessible to one of the emergency networks during the on-going emergency. For example, updated location data of a hijacked taxi may be periodically transmitted to the emergency data manager 100 and made accessible to one or more emergency networks.

The ADR server 1073 may provide an interface for posting or receiving static or dynamic emergency profile data. Such additional data may include, but is not limited to, medical data, personal data, demographic data, and health data, which may be obtained from various databases. For example, medical data may include information relating to a person's medical history, such as medications the person is currently taking, past surgeries or preexisting conditions. Personal data may include a person's name, date of birth, height, weight, occupation, addresses such as home address and work address, spoken languages, etc. Demographic data may include a person's gender, ethnicity, age, etc. Health data may include information such as a person's blood type or biometrics such as heart rate, blood pressure or temperature. Additional data may further include data received from connected devices such as vehicles, IoT devices, and wearable devices such as medical bracelet, smartwatch or other devices, etc. For example, intelligent vehicle systems may generate and send data regarding a crash, such as the speed at which the vehicle was moving just before the collision, where the vehicle was struck, the number of occupants, etc. The ADR server 1073 interfaces may be implemented in whole or in part using a REST API, for example using JSON (JavaScript Object Notation).

In one example of operation, if an emergency call is made from a mobile phone, or if an emergency alert is sent, the mobile phone may receive a heart rate of the person who made the emergency call from a smartwatch worn by the person and communicatively coupled to the cell phone via a Wi-Fi™ or Bluetooth™ connection or some other wireless connection. The mobile phone may therefore send the heart rate to the data ADR server 1073, along with any other additional data, in an HTTP POST. The ADR server 1073 may communicate with a device via a mobile application installed on the device or integrated into the firmware or operating system of the device. Additional data may also be sent to the ADR server 1073 from a network server. The ADR server 1073 may be accessed by any connected platform that receives data that might be relevant in an emergency. Connected platforms, such as various databases, may therefore send additional data to the ADR server 1073 at any time. A website, web application, or mobile application may communicate with the ADR server 1073 and may allow device users to create profiles to send additional data included in the profiles to the ADR server 1073 every time a profile is created or updated.

The ADR server 1073 may also include a multimedia ingestion module to provide an interface for posting or receiving data such as audio or video streams obtained during an emergency from a device that is proximal to the emergency. In one example of operation, if an emergency alert is generated by an intelligent vehicle system installed in a vehicle in response to the vehicle experiencing a collision, the emergency alert is sent to one of the emergency networks by the intelligent vehicle system or by another device communicatively coupled to the intelligent vehicle system, such as a mobile phone coupled to the intelligent vehicle system via Bluetooth™. In response to generating the emergency alert, the intelligent vehicle system may additionally begin streaming audio and video from microphones and cameras installed inside or outside of the vehicle to the emergency data manager 100 through the ADR server 1073. A mobile phone communicatively coupled to the intelligent vehicle system may additionally or alternatively stream audio or video from microphones and cameras integrated into the mobile phone to the emergency data manager 100 through the ADR server 1073. One or more of the ADR server 1073 multimedia ingestion modules or interfaces may be implemented wholly or partly using REST APIs that are accessed with an HTTP POST. Other ADR server 1073 interfaces may include H.323 or some equivalent thereof.

After receiving the relevant data, the ADR server 1073 can store the data in one or more databases operatively coupled to the emergency data manager 100. The emergency data manager 100 may be operatively coupled to databases such as, but not limited to, a location database, the geofence database, etc. The emergency data manager 100 databases may also be operatively coupled to, or otherwise accessible by, the emergency network 107. The ADR server 1073 is operative to tag or otherwise associate received data with an identifier of a user or specific device 160 associated with the data. For example, the ADR server 1073 may tag received data with a user ID number, an email address, or a phone number (i.e. caller ID), a MAC address, or other device or user identification information, etc. The ADR server 1073 may also tag received data based on the data source using, for example, a device name or type, an application name, user name, phone number, corporate account, or etc.

An individual or group of individuals may be associated with multiple identifiers. In an example of operation, if the LIS 1071 receives a location generated by a phone associated with the phone number +1-555-555-5555, associated with John Doe, the data ADR server 1073 may also receive a heart rate from a smartwatch associated with the email address johndoe@email.com, which is an identifier that is also associated with John Doe. In this example, the LIS 1071 tags the location with the phone number "+1-555-555-5555," and with the email address "johndoe@email.com," and the ADR server 1073 tags the heart rate with the same identifiers, thereby associating both the location and the heart rate with John Doe in the emergency data manager 100 databases.

Ingestion data that enters the emergency data manager 100 may include various data fields and associated data entries within the data fields. The emergency data manager 100 maintains a list of expected data fields so that the data entries can be entered within a specific data field.

The LIS 1071 may support interfaces implemented wholly or partly via a JSON REST API that is operative to receive a query or request such as, but not limited to, an HTTP GET request, from the emergency network 107 or the emergency responder device 113. The LIS 1071 data retrieval interface may provide a single GET endpoint for retrieving either the latest or paginated list of locations for a specific caller ID. For example, a phone number associated with mobile device 101 from which a location was received may be included in a header, body, or metadata of a request sent to the LIS 1071. The LIS 1071 may then retrieve a location or set of locations from the emergency data manager 100 databases and deliver the location or set of locations to the relevant authorized emergency network 107 or to the emergency responder device 113 associated with the authorized emergency network 107. The LIS 1071 may include a NG911 standards-based XML API for the retrieval of location data from the emergency data manager 100 databases. The LIS 1071 may be operative to accept HELD requests from the emergency network 107 or from the emergency responder device 113 and to return location data for a specific caller ID or anonymous reference.

The ADR server 1073 may include a data retrieval interface implemented as a JSON REST API for the retrieval of emergency or additional data. Additional data may include, but is not limited to, medical data, personal data, demographic data, health data or other data which may be protected data. Additional data may also include data received from connected devices such as, but not limited to, the mobile device 101, vehicles, IoT devices, and wearable devices. The ADR server 1073 may be operative to receive a query or request, such as an HTTP GET request, from the emergency network 107 or emergency responder device 113. The ADR server 1073 may then, in response to a request, retrieve additional data associated with a specific or particular identifier of a user or a device associated with the user, such as a phone number, and return the data to the emergency network 107 or emergency responder device 113.

The emergency data manager 100 determines which emergency networks and associated emergency responder devices have authorization to receive particular types of emergency data. For example, a given emergency network or emergency responder device may, in certain circumstances, be granted access only to a particular subset of emergency data. For example, a police officer may only be given access to the location emergency data, while an EMT (emergency medical technician) may only be given access to an additional data emergency data. However, a given emergency network such as a national or regional emergency network, or associated emergency responder device, may be given differential access to the entirety of the emergency data, or to particular emergency data categories within the databases based on any factor or set of factors. A management portal may be provided by the emergency network managers 1079 to determine which emergency data categories are returned from one of the emergency networks to a particular emergency network or emergency responder device. Other data services corresponding to the various databases may also be coordinated with respect to granting access to protected data. The emergency network profiles 1035 stored in memory 1031 may contain these settings related to release of data. The emergency network managers 1079 also provide authentication and login capabilities for the various emergency networks and enable APIs 1078 for communication between the emergency network entities and the LIS 1071, ADR server 1073, geofence module 1075, and mapping module 1077.

During an emergency, the emergency data manager 100 is operative to detect the emergency and/or otherwise identify the need to provide emergency data pertaining to the emergency. In response to detecting an emergency, the emergency data manager 100 is operative to identify any emergency data pertaining to the emergency stored within local or remote databases, and retrieve and transmit the pertinent emergency data to the appropriate emergency network. The emergency data manager 100 may act as a data pipeline that automatically pushes emergency data to emergency networks that would otherwise be without access to emergency data that is critical to most effectively and efficiently respond to an emergency. Location data stored within, and/or obtained and provided by, the emergency data manager 100, enables emergency responders to arrive at the scene of an emergency faster, and the additional emergency data stored within, and/or obtained and provided by, the emergency data manager 100 enables emergency responders to be better prepared for the emergencies they face.

The emergency data manager 100 is operative to provide a cloud-based application to multiple emergency networks, and to multiple emergency responder devices, by establishing network connections via the IP protocol stack 1055, with various emergency network entities such as a call handling workstation, CAD workstation etc., and with emergency responder devices such as, but not limited to, smartphones, laptops, tablets, in-vehicle computer systems, etc. Other examples of emergency network entities include, but are not limited to, customer premises equipment (CPE) (private branch exchanges, SIP gateways, etc.), servers, desktop computers, laptops, routers, switches, etc. that are operative to send and receive data. The network connections may be transport control protocol (TCP) connections and may utilize web socket connections between the emergency data manager 100 and an emergency network entity. Likewise, TCP and web socket connections may be established between the emergency data manager 100 and emergency responder devices.

In some implementations, a geofence module 1075 is present and is operative to determine emergency network jurisdictional boundaries and to show the jurisdictional boundaries on a graphical user interface as a jurisdictional map view within an emergency data manager (EDM) EDM portal GUI. The mapping module 1077 is operative to generate the map view and to also post emergency data locations as location indicators on the map view. The mapping module 1077 is operative to generate a map view with or without the geofence module 1075. For example, the map view may be generated using location data based on emergency call locations for mobile device identifiers received by the LIS 1071. When geofence data is available for a given emergency network, the geofence module 1075 will provide the emergency network jurisdictional boundary to the mapping module 1077 to further enhance the map view displayed. In that case, emergency data may be provided only to emergency networks when the location data is within the jurisdictional boundary of the specific emergency network. The map view is operative to provide and display location indicators that show the location of incoming emergency calls that the emergency network has not yet received, has received, or is in the process of receiving. The not yet received calls can be displayed based on location information received by the LIS 1071 because the location data is received prior to completion of emergency call routing to the emergency network.

Emergency networks and their corresponding emergency network entities are associated with a given geographic boundary. Based on the geographic boundary for a respective emergency network, a jurisdictional map view customized for the respective emergency network may be generated and provided to emergency network entities such as workstations for display. Within the jurisdictional map view for the emergency network, location indicators for emergencies occurring within its geographic boundary may be displayed. The jurisdictional map view for a given emergency network may include one or more geofences associated with the respective emergency network and surrounding areas.

In an example of emergency data manager 100 operation, an emergency alert may be triggered by a given device such as mobile device 101, for example by a user pressing a soft button, a physical button, initiating a voice command, or gesture, or autonomously based on sensor data such as from a smoke alarm. In this example, the user may be prompted to confirm the emergency or otherwise provide authorization for sending the emergency alert. Emergency data, such as an enhanced location and additional data regarding the user, such as the user's medical history, may then be delivered by the device to the emergency data manager 100 and stored in a database. The emergency data manager 100 may format the emergency data into a format that is compatible with industry standards for storing and sharing emergency data. For example, the emergency data may be formatted to be compatible with National Emergency Number Association (NENA) standards. The emergency data manager 100 may perform a push operation to push the emergency data to an emergency network entity or to an emergency responder device. After the push operation, the emergency data manager 100 may delete any temporarily stored data if required for compliance with privacy laws, regulations and policies.

An emergency network, such as by a PSAP responding to an emergency alert, may obtain emergency data by sending a query to the emergency data manager 100. The query may be an emergency data request using, for example, an HTTP GET request. The emergency data request may also be in the form required by the Location Information Server (LIS) protocol and/or a protocol required by the ADR server 1073. In response to the emergency data request, the emergency data manager 100 sends an appropriate response including relevant emergency data to the requesting party via an encrypted pathway. The emergency data request may be in the form of an HTTP-Enabled Location Delivery (HELD)

and the response from the emergency data manager 100 may be in the form of a Presence Information Data Format Location Object (PIDF-LO) as defined by the Internet Engineering Task Force (IETF).

The emergency data request includes an authorization code, also referred to as an "authorization token", in the body, header, or metadata of the request, and the emergency data manager 100 checks that the authorization code is active before providing a response to the requesting party. Authorization may be provided in the "Authorization" header of the emergency data request using HTTP Basic Authentication. For example, authorization may be a base64-encoded user name and password for an account associated with the requesting party. Emergency data requests are sent over public networks using API access keys or credentials. Transport Layer Security (TLS) may be used in the requests and responses from the emergency data manager 100 for encryption security.

Figure 11:
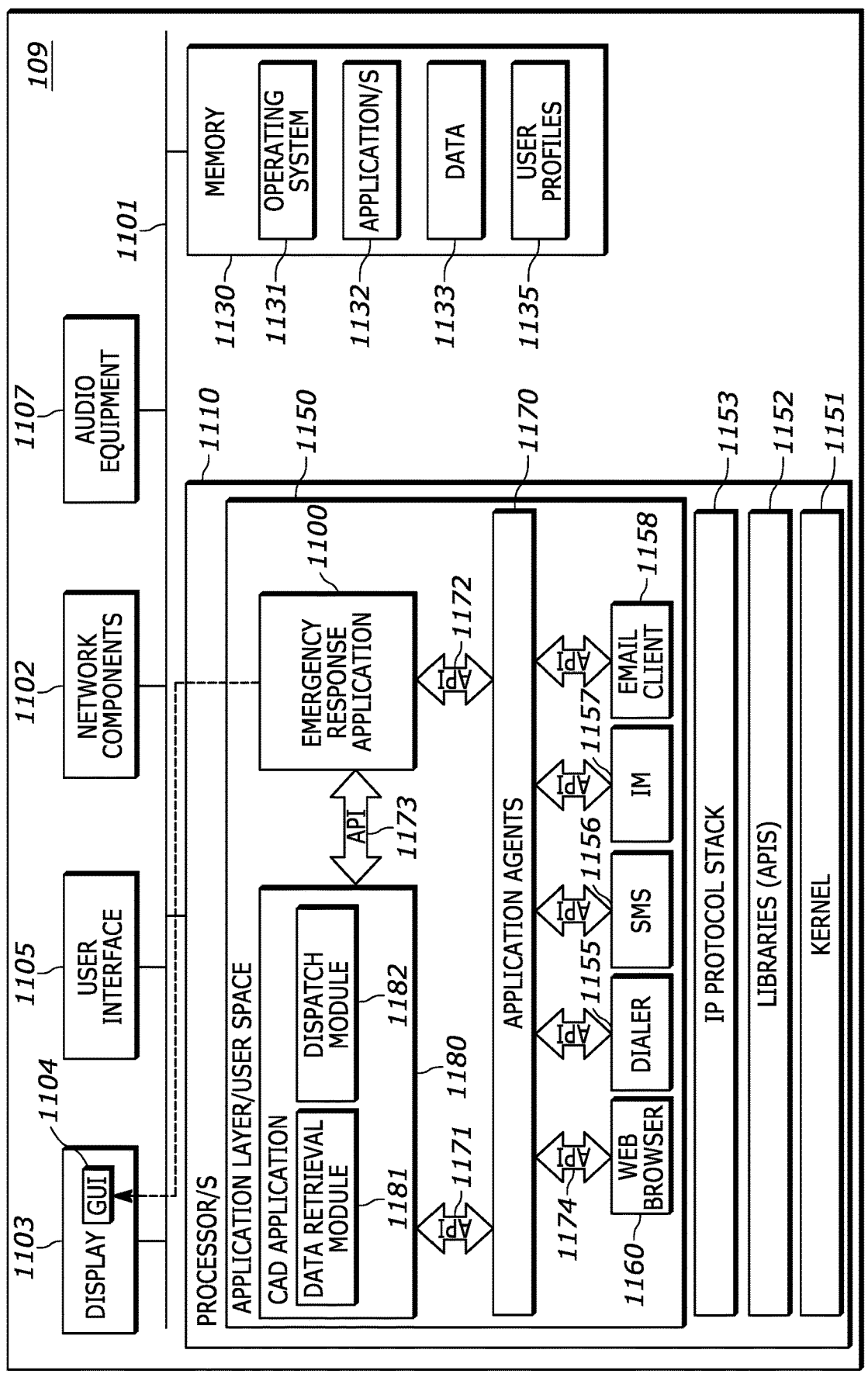
FIG. 11 is a diagram of an example emergency network entity that has an emergency response application to communicate with the emergency data manager in accordance with an example embodiment.

FIG. 11 provides an example emergency network entity 109 which is a CAD (computer-aided-dispatch) workstation. An emergency network may be implemented with multiple emergency network entities of various kinds and therefore may have multiple workstations for example one or more call handling workstations, one or more CAD workstations, etc., in addition to routers, switches, hubs, access points, and other emergency network entities, etc. The example CAD workstation may include a display 1103, a user interface 1105, audio equipment 1107, network components 1102, at least one processor 1110, and at least one non-volatile, non-transitory memory 1130 in addition to RAM. The network components may include one or more network transceivers for Ethernet connectivity to other workstations and devices and an Internet connection. The memory 1130 stores executable instructions and data such as operating system executable instructions 1131 and application executable instructions 1132 for various applications. The memory 1130 also stores data 1133 which may provide data caching.

The processor 1110 may be implemented as one or more microprocessors, DSPs, ASICs, FPGAs, microcomputers, microcontrollers, digital signal processors, central processing units, state machines, logic circuitries, and/or devices that manipulate signals based on operational instructions. Among other capabilities, the processor 1110 is configured and operative to fetch and execute computer-readable instructions (i.e. executable instructions) stored in the memory 1130. For example, the application executable instructions 1132, when executed by the at least one processor 1110, may provide an operating system, a dialer application 1155, a short-message-service (SMS) application 1156, an instant message (IM) application 1157, a web browser 1160, an email client 1158 and one or more instant message (IM) and voice applications which may each provide IM and voice call capability separately or in combination. The operating system may include a kernel 1151, libraries 1152 (also referred to as "application programming interfaces" or APIs) and an application layer 1150 or user space within which the various applications are executed, and an IP protocol stack 1153.

In the example workstation of FIG. 11, the application executable instructions 1132, when executed by the at least one processor 1110, provide an emergency response application 1100 with associated GUI 1104 (EDM portal GUI), a computer aided dispatch (CAD) application 1180 including an emergency call data display module 1181, and a dispatch module 1182. An associated CAD software GUI from the CAD application 1180 may be displayed on the display 1103. The emergency response application 1100 is operative to communicate with the emergency data manager 100 and with an emergency responder device 113 to provide emergency data.

The emergency response application 1100 provides the EDM portal GUI 1104 on the workstation display 1103, and on the emergency responder device 113, and displays augmented emergency data such as, but not limited to, augmented location data received from the emergency data manager 100. Communication is established between the emergency response application 1100 and the emergency data manager 100 using the IP protocol stack 1153 and a network connection is established which may be a TCP connection and which may include one or more web socket connections. A second web socket connection may be established to the emergency responder device 113 from the emergency response application 1100.

Figure 12:
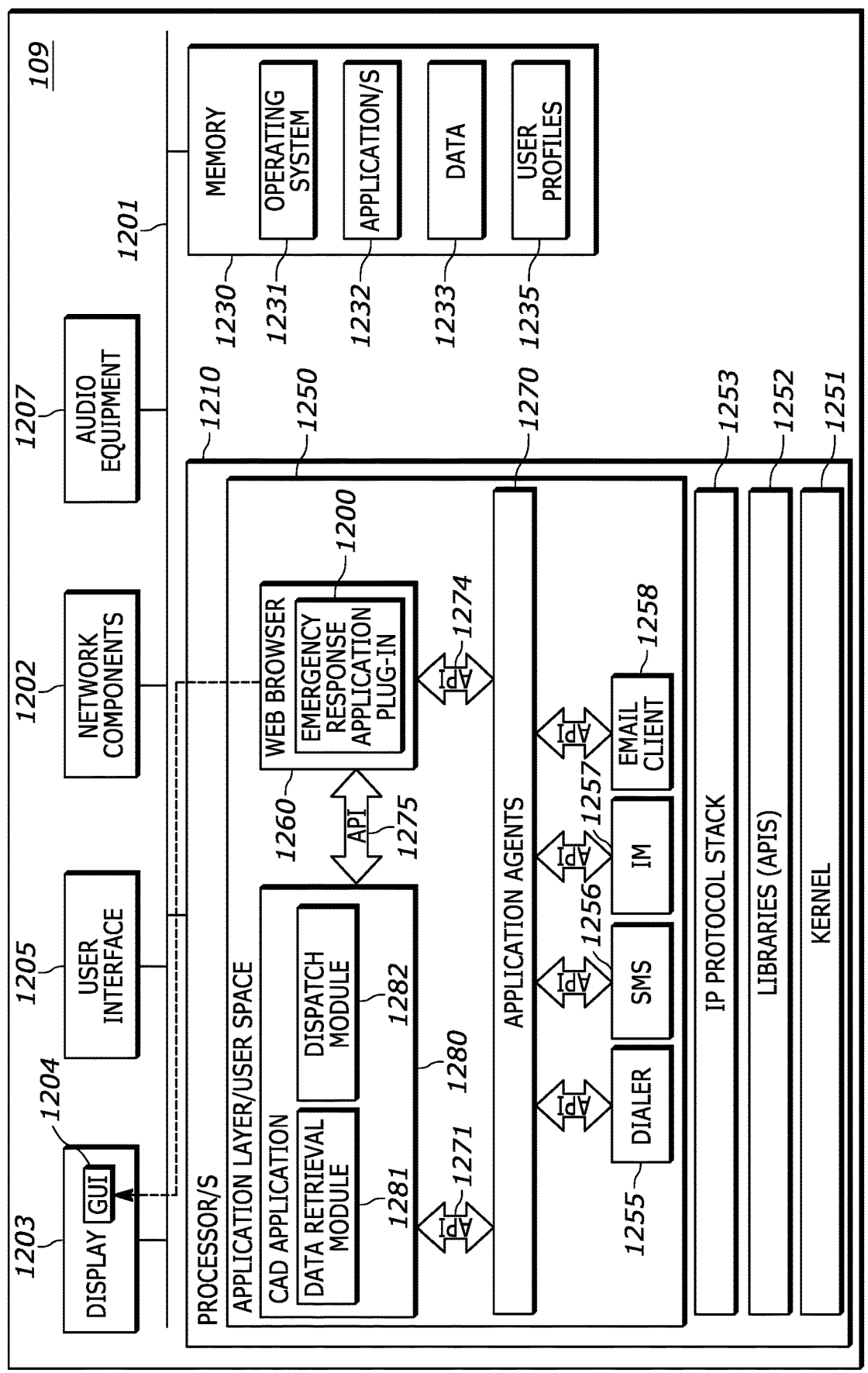
FIG. 12 is a diagram of an example emergency network entity that has an emergency response application plug-in operating in a web browser to communicate with the emergency data manager in accordance with an example embodiment.

FIG. 12 is a diagram illustrating another example emergency network entity 109 which is a CAD workstation having an emergency response application plug-in 1200 with a web browser 1260 in accordance with another embodiment. In the example implementation of FIG. 12, the web browser 1260 communicates with the emergency data manager 100 to provide the EDM portal GUI 1204 as a SaaS interface. The emergency response application plug-in 1200 uses an established IP protocol stack 1153 connection between the workstation and the emergency data manager 100 using the web browser 1260 and may facilitate communication with emergency responder devices. The IP connection between the emergency data manager 100 and the emergency response application plug-in 1200 may utilize one or more web socket connections. In some embodiments, the emergency response application plug-in 1200 may communicate via the API 1275 with an integration with the CAD application 1280.

Figure 13:
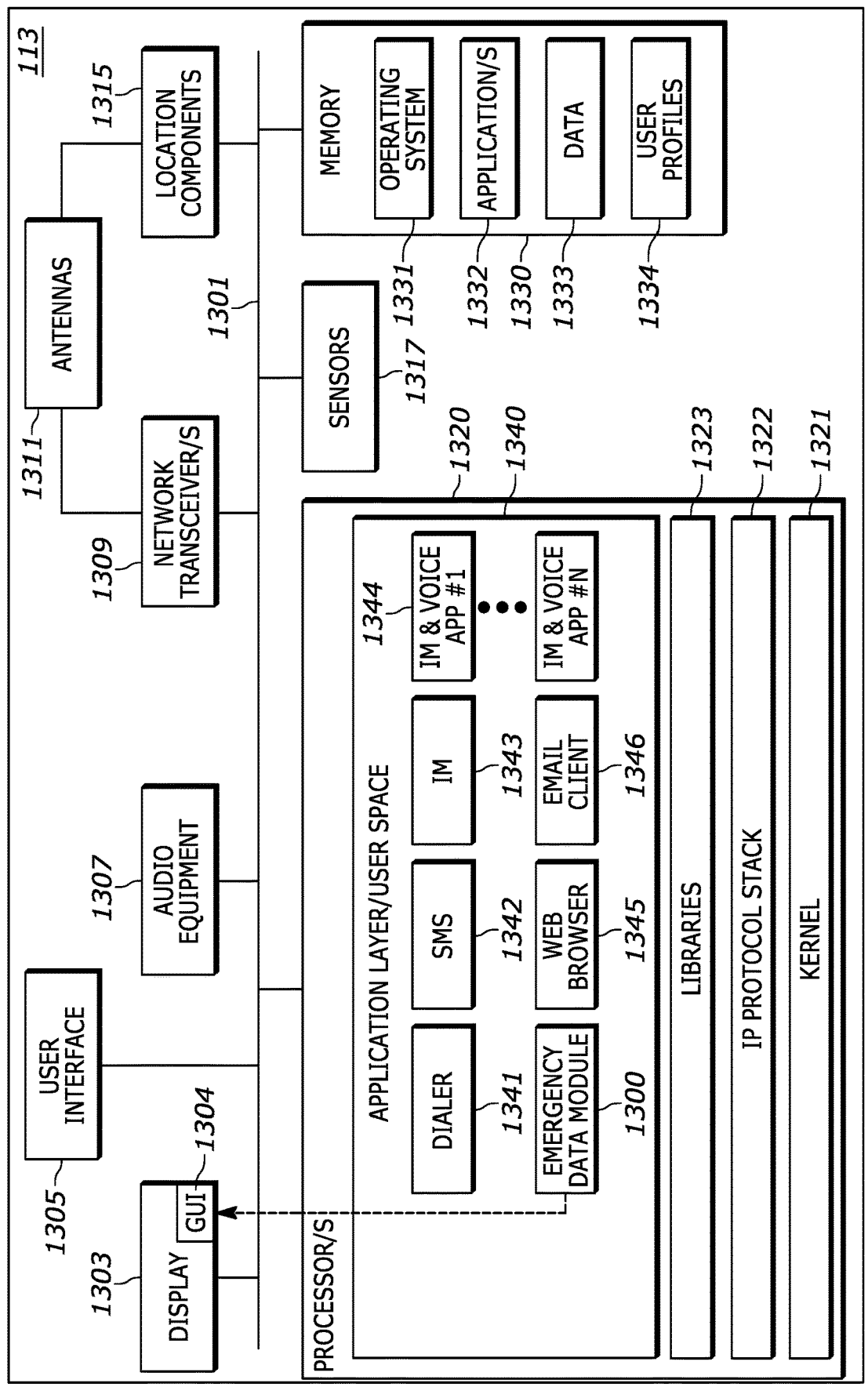
FIG. 13 is a diagram of an example emergency responder device.

FIG. 13 is a block diagram providing an example of internal components of an emergency responder device 113. It is to be understood that FIG. 13 is an example only, and that a given emergency responder device 113 may have more components, less components, or different components than shown, depending on the specific function and type of device. Further, depending on the type of device, there may be hardware only, hardware and firmware, hardware and software, etc. and may therefore be implemented in various ways not limited by the components shown in the FIG. 13 example. The example emergency responder device 113 may be, but is not limited to: a mobile or cellular phone such as a smartphone; a computer, laptop, or tablet; a vehicle console; an Internet of Things (IoT) device, or a walkie-talkie or two-way radio; etc.

The example emergency responder device 113 may include a display 1303, a user interface 1305, audio equipment 1307, network transceiver/s 1309, antennas 1311, emergency data module 1300, location components 1315, sensors 1317, at least one processor 1320, and at least one non-volatile, non-transitory memory 1330 in addition to RAM. Network components may include one or more wireless network transceivers for wireless communication such as for cellular communication via LTE or 5G, in addition to Wi-Fi™, Bluetooth™, etc. The memory 1330 stores executable instructions and data such as operating system executable instructions 1331, various application executable instructions 1332, user profiles 1334 and data 1333. The application executable instructions 1332, when executed by the at least one processor 1320, provide a dialer 1341, SMS client 1342, instant messaging client 1343, web browser 1345, email client 1346, various instant messaging and voice applications 1344 and an emergency data module

1300. The operating system executable instructions 1331, when executed by the at least one processor 1320 provide an application layer (user space) 1340, libraries (APIs) 1323, an IP protocol stack 1322, and a kernel 1321.

The emergency data module 1300 is operative to communicate with the emergency data manager 100 in response to selection input via the user interface 1305 that selects a link which may be displayed by the SMS client 1342, the email client 1346 the IM client 1343 or any of the various IM and voice applications 1344 (i.e. "over-the-top" voice applications) which may each provide IM and voice call capability separately or in combination. The IM and voice applications 1344 are referred to as "over-the-top" applications because the operate within the application layer of a mobile operating system and operative separately from the native dialer of the emergency responder device 113. The emergency data module 1300 is operative to provide an EDM portal GUI 1304 that displays emergency data from the emergency data manager 100. In an alternative implementation, the EDM portal GUI 1304 is provided by the web browser 1345 and accesses the emergency data manager 100 via a persistent IP connection that may include one or more web socket connections between the emergency responder device 113 and the emergency data manager 100.

The emergency responder device 113 may, in the case of mobile telephones, include a SIM card or other removable, replaceable memory components in addition to memory 1330. User profiles 1334 stored in memory 1330 may contain information related to specific devices user configuration preferences, data sharing permissions, etc., and emergency responder device 113 identification information.

The processor 1320 may be implemented as one or more microprocessors, ASICs, FPGAs, microcomputers, microcontrollers, digital signal processors, central processing units, state machines, logic circuitries, and/or devices that manipulate signals based on operational instructions. Among other capabilities, the processor 1320 is configured and operative to fetch and execute computer-readable instructions (i.e. executable instructions or executable code) stored in the memory 1330.

All of the components of the emergency responder device 113 are operatively coupled by an internal communication bus 1301. The display 1303 is operatively coupled to the user interface 1305 or may be considered a part of the user interface 1305 such as in the case of a touchscreen which is both a display and a user interface in that it provides an interface to receive user input or user interactions. In some devices, the display 1303 may not include a touchscreen, but may include one or more lights, indicators, lighted buttons, or combinations of these. The user interface 1305 may also include physical buttons such as an on/off button or volume buttons, and the audio equipment 1307 may include a microphone and a speaker.

The example emergency responder device 113 may also include various accessories that allow for additional functionality. Such accessories (not shown) may include one or more of the following: a microphone, a camera, speaker, a fingerprint scanner/reader, health or environmental sensors, a USB or micro-USB port, a headphone jack, a card reader, a SIM card slot, or any combination thereof. The one or more sensors may include, but are not limited to: a gyroscope, and an accelerometer which may be incorporated into an Inertial Measurement Unit (IMU); a thermometer; a heart rate sensor; a barometer; or a hematology analyzer, or some other type of biometric sensor or medical analysis tool.

Figure 14:
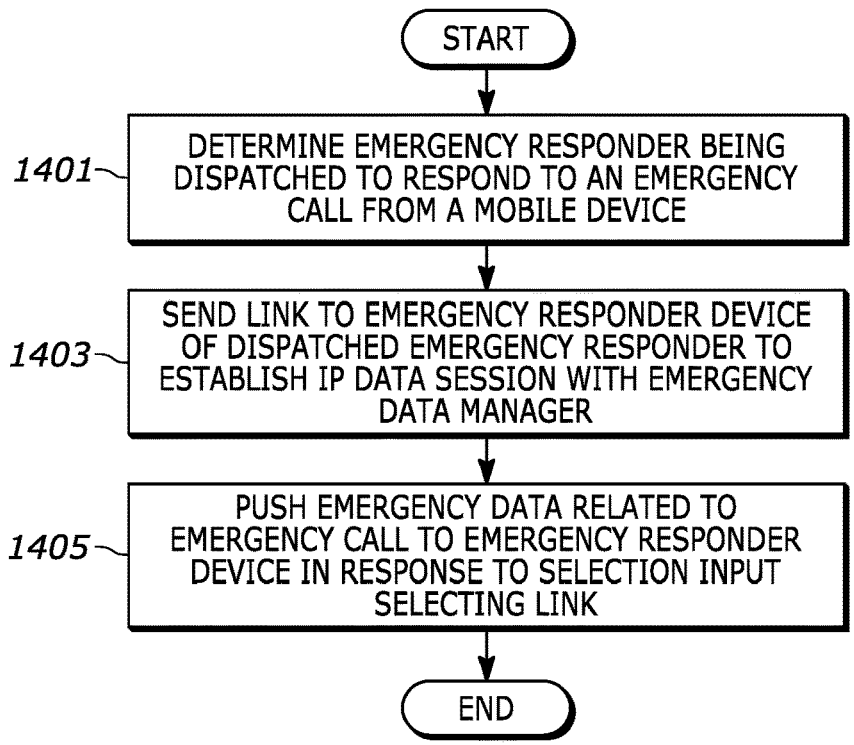
FIG. 14 is a flowchart of a method of operation in accordance with various embodiments.

FIG. 14 is a flowchart of another method of operation in accordance with various embodiments. The method of operation begins, and in operation block 1401, the emergency network entity, or an operator, determines an emergency responder being dispatched to respond to an emergency call from a mobile device. In operation block 1403, the emergency network entity, or the emergency data manager may send link to the emergency responder device of the dispatched emergency responder, to establish an IP data session with between the emergency data manager 100 and the emergency responder device. In operation block 1405, the emergency data manager 100 will push emergency data related to the emergency call to the emergency responder device in response to selection input selecting the link. In some embodiments, the emergency data manager 100 will send streaming data to the emergency responder device.

Figure 15:
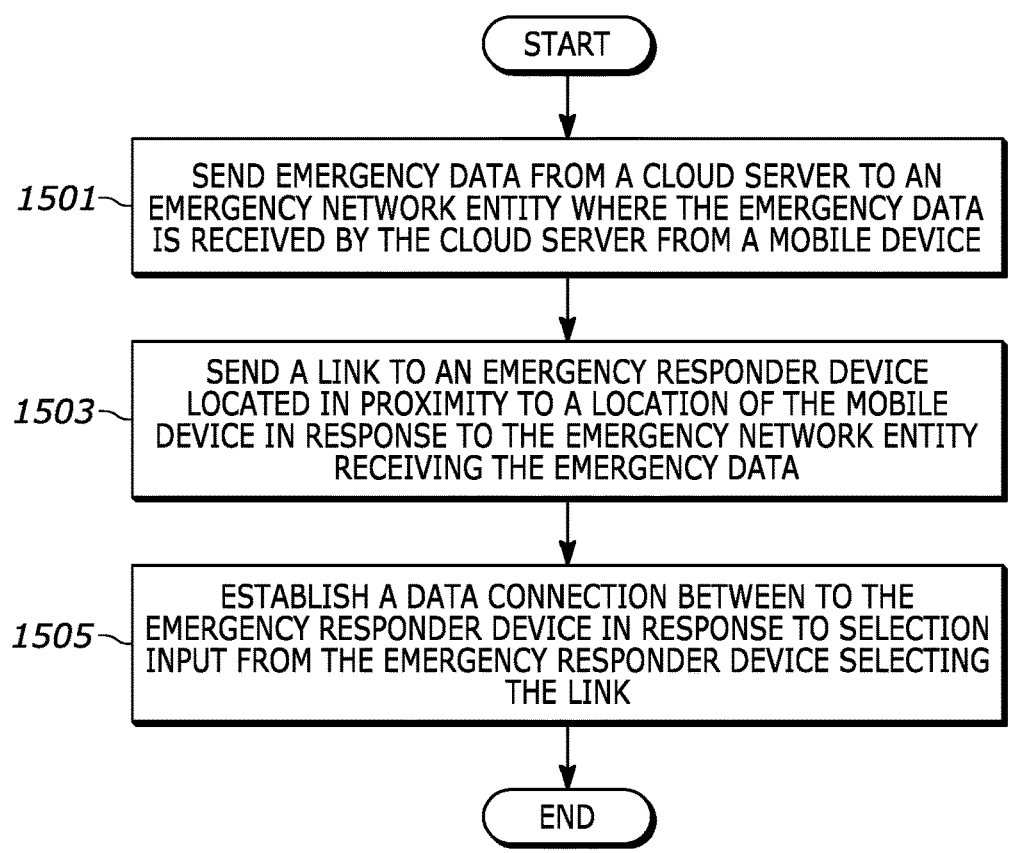
FIG. 15 is a flowchart of a method of operation in accordance with various embodiments.

FIG. 15 is a flowchart of another method of operation in accordance with various embodiments. The method of operation begins, and in operation block 1501, the emergency data manager 100, which may be implemented as a cloud server, sends emergency data to an emergency network entity where the emergency data is received by the emergency data manager cloud server from a mobile device that has placed an emergency call. In operation block 1503, either the emergency data manager cloud server or the emergency network entity may send a link to an emergency responder device located in proximity to a location of the mobile device, in response to the emergency network entity receiving the emergency data from the emergency data manager. In operation block 1505, the emergency data manager cloud server establishes a data connection between to the emergency responder device in response to selection input from the emergency responder device selecting the link. A data connection may also be established between the emergency responder device and the mobile device that placed the emergency call in some implementations. The mobile device data connection may be a second data connection, that is second to a first data connection between the emergency responder device and the emergency data manager cloud server.

Figure 16:
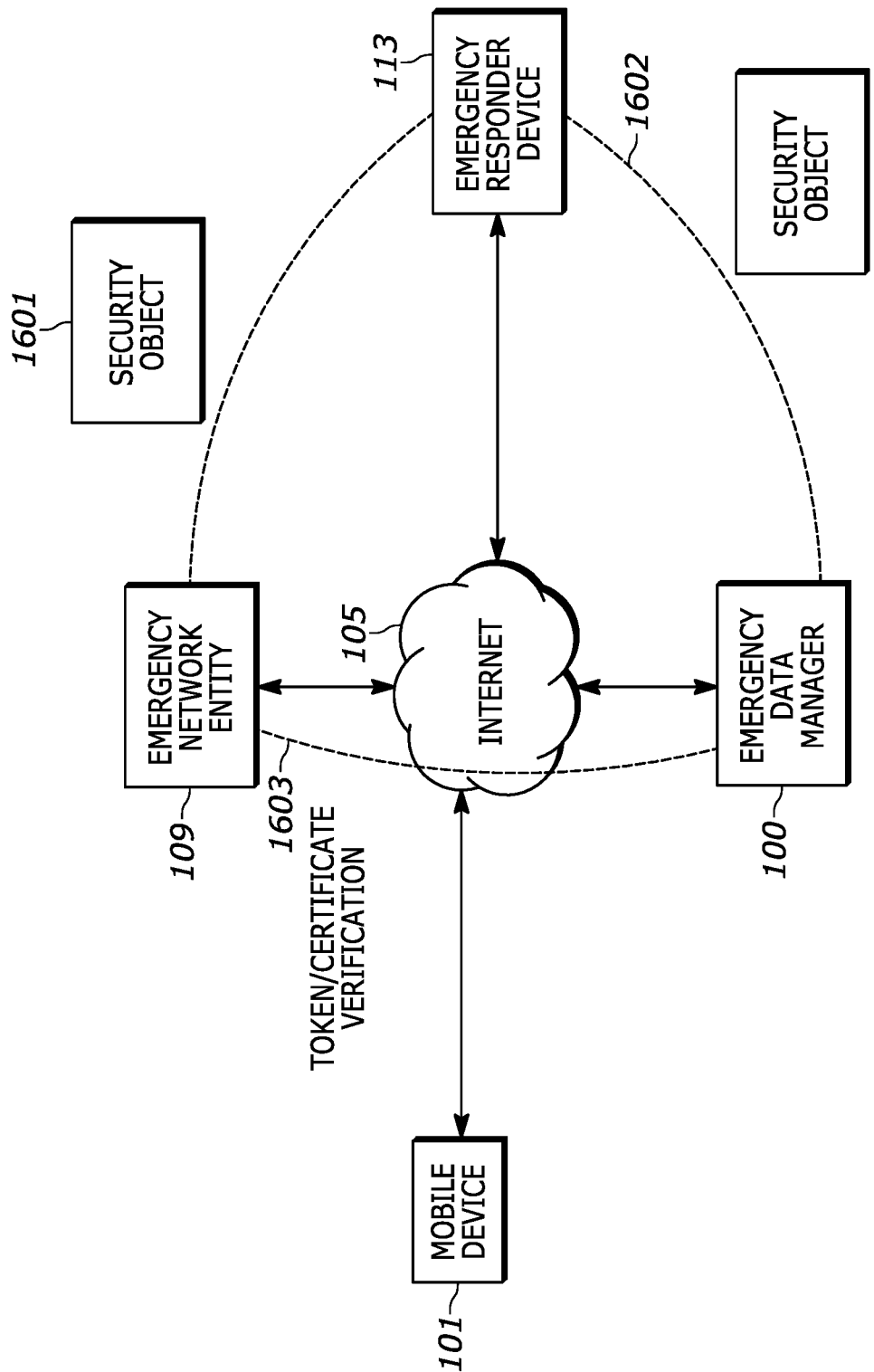
FIG. 16 is an example of an exchange of security objects between an emergency responder device, an emergency data manager and an emergency network entity in accordance with an example embodiment.

FIG. 16 is an example of an exchange of security objects between the emergency responder device 113, the emergency data manager 100 and the emergency network entity 109. The security objects may be, but are not limited to, tokens, digital signatures, digital certificates, etc. In some embodiments, a security handshaking protocol occurs prior to pushing or streaming emergency data 104 to the emergency responder device 113. In one example, a first security object 1601 is exchanged between the emergency network entity 109 and the emergency responder device 113, while a second object 1603 is exchanged between the emergency data manager 100 and the emergency responder device 113. The emergency network entity 109 and the emergency data manager 100 perform a verification operation 1603 to validate and authorize the emergency responder device 113 prior to sending it emergency data. In one embodiment, a designated confirmer signature is used where either the emergency network entity 109 or the emergency data manager 100 serves as the designated confirmer. In another embodiment, group signatures with a trusted arbitrator are used in which the emergency network entity 109 or the emergency data manager 100 serves as the trusted arbitrator. The verification may use undeniable digital signatures in some embodiments. Further, in some embodiments, two or more protocols may be used prior to authenticating the emergency responder device 113 to receive emergency data.

Figure 17:
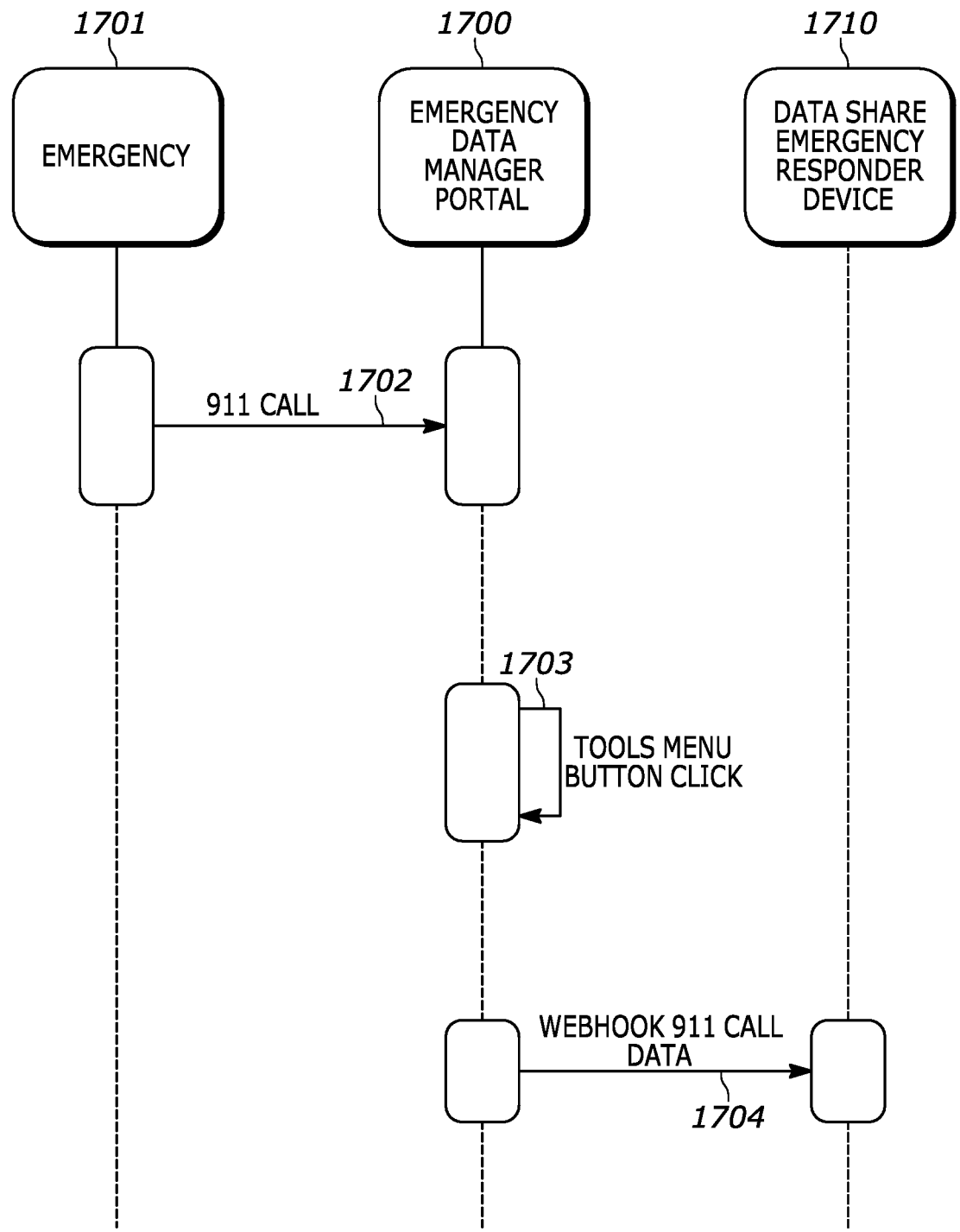
FIG. 17 is a message flow diagram of data sharing between the emergency data manager and an emergency responder device in accordance with an example embodiment.

FIG. 17 provides an overview of data sharing between the emergency data manager 100 and an emergency responder device 1710. The emergency data manager 100 provides an emergency data manager portal 1700 to emergency network personnel who may view that an emergency call 1702 has been received from a mobile device 1701. The emergency network operator may select a tools menu 1703 on the portal 1700 and select data sharing. A webhook 1704 with emergency call data may then be provided to the emergency responder device 1710. The portal 1700 data sharing feature enables the ability to receive 911 emergency call data (e.g. phone number, call location, caller additional data, etc. . . . ) when shared directly by a 911 telecommunicator using the portal 1700.

Figure 18:
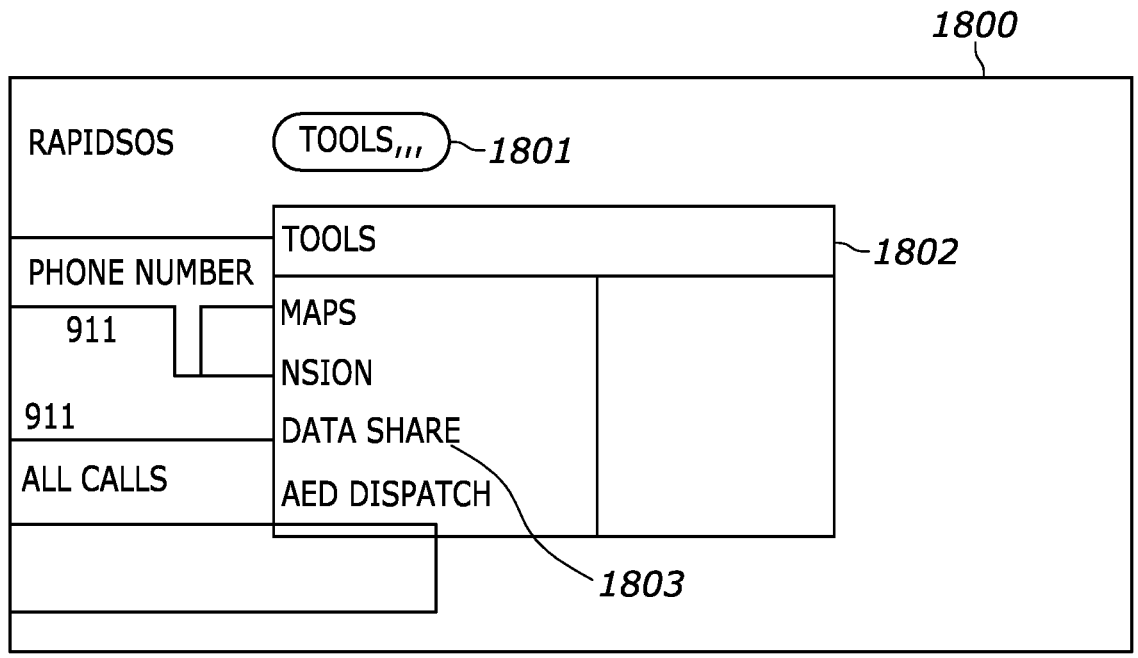
FIG. 18 is an example emergency data manager portal graphical user interface (GUI) for executing data sharing to an emergency responder device in accordance with an example embodiment.

FIG. 18 provides an example graphical user interface (GUI) 1800 displayed within the portal 1700. A tools menu button 1801 is selectable and provides a dropdown menu 1902 from which the option "Data Share" 1803 may be selected. A further dropdown menu may allow for selection of a specific emergency responder device to which data is to be shared. Invoking data sharing may further invoked the security procedures discussed with respect to FIG. 16.

Figure 19:
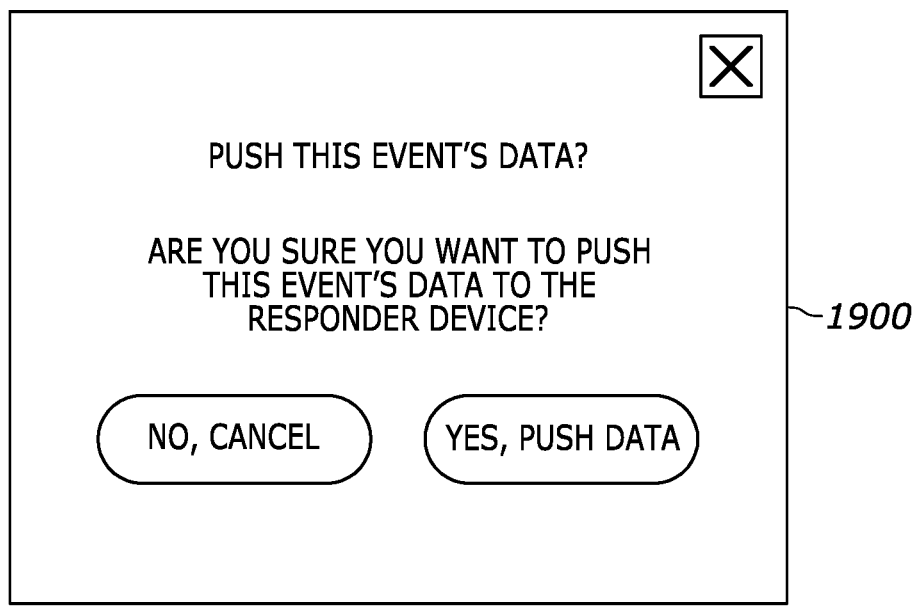
FIG. 19 is a diagram showing a popup dialogue box that may overlay the emergency data manager portal GUI in which the popup dialogue box asks the emergency network operator to confirm pushing or streaming the data to the emergency responder device in accordance with an example embodiment.

FIG. 19 illustrates a popup dialogue box 1900 that asks the emergency network operator to confirm pushing or streaming the data to the emergency responder device. The popup dialogue box 1900 may be an overlay of the GUI 1800 that persists until the emergency network operator confirms or cancels the data share. Once the portal user has confirmed their intent to share, the emergency data manager 100 will share the emergency data with the designated emergency responder device using, in one example, a webhook interface. The emergency responder device in this example embodiment will have a web request handler capable of receiving emergency data manager 100 data share web requests, which will be signed, unauthenticated POST requests. The data sharing handler may, in some embodiments, be implemented as a HTTP request handler.

A data sharing handler in accordance with one example embodiment is operative to accept POST requests at the 'Handler URL' endpoint provided to the emergency data manager 100, accept payloads in the JSON format, and optionally validate a security signature contained in a request header. In some embodiments, the security signature may be an HMAC-SHA (hash-based message authentication code) signature contained in the signature field header in the request. The data sharing handler in accordance with an example embodiment is further operative to: decode and validate the JSON Payload, return an appropriate response code based on the received payload (such as: 200 If the payload is acceptable, 400 if the payload is malformed, and 401 if the payload signature is invalid).

Examples of the emergency data that may be shared with the emergency responder devices includes, but is not limited to, phone number of a selected 911 call in the emergency data manager 100 portal, incident location (i.e. lat/long) of selected 911 call, a security token for accessing additional data and/or the latest location of selected 911 call, an emergency network account ID, and emergency network jurisdiction boundary box, etc.

In some embodiments, the security token will expire after a predetermined period of time such as, for example, ten minutes after termination of a 911 emergency call. Some types of data may not be transmitted to the emergency responder device if there is no authorization for that specific device user to receive the specific information. For example, medical data may be sent to some but not other emergency responder devices due to HIPPA requirements for data security and sharing.

Figure 20:
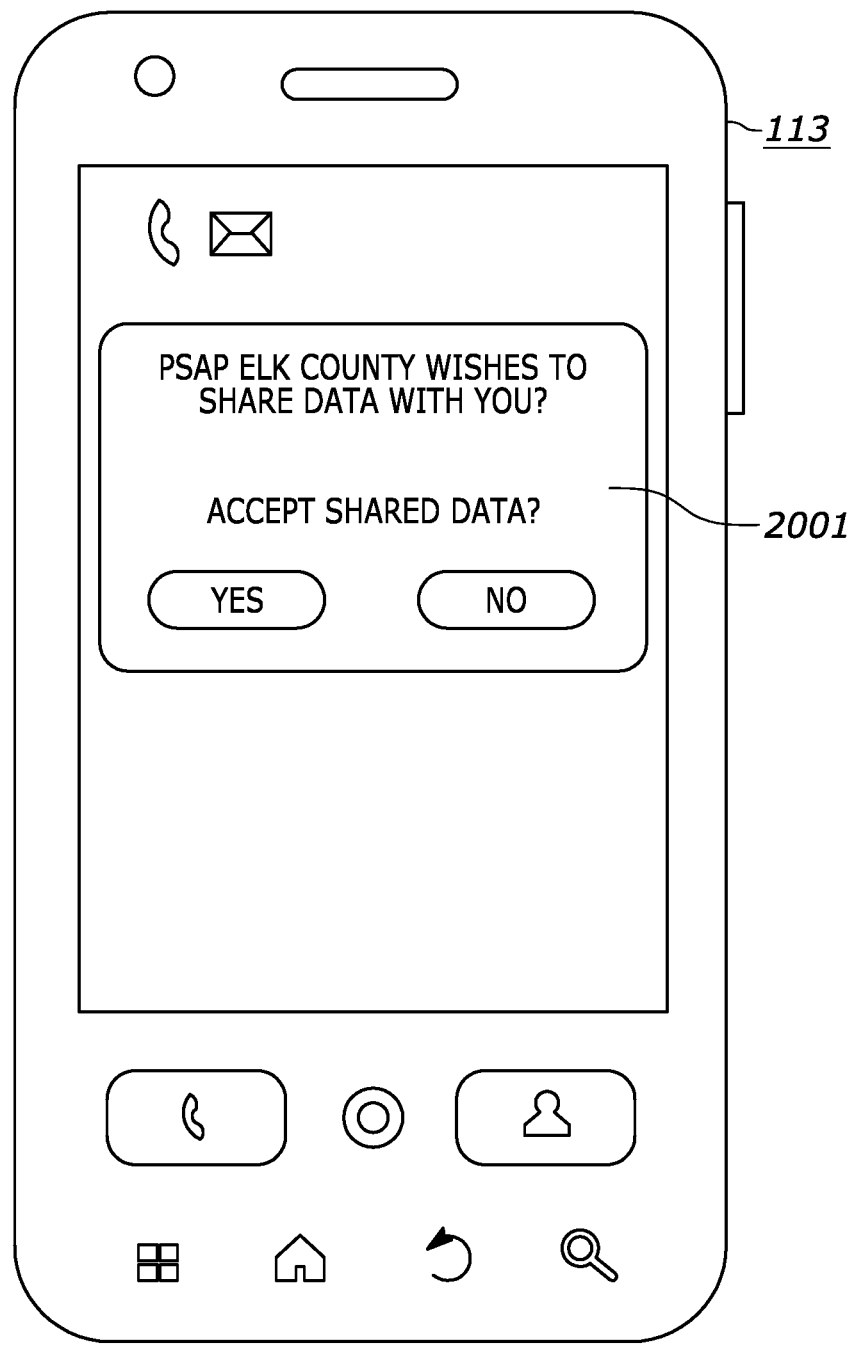
FIG. 20 is an example of an emergency responder device displaying a message that includes a link to implement data sharing from the emergency data manager in accordance with an example embodiment.

FIG. 20 is an example of an emergency responder device 113 displaying a message 2001 that includes a link to data from the emergency data manager 100. The emergency responder device 113 receives this message after the emergency network operator setup and confirmed data sharing as in FIG. 18 and FIG. 19. The emergency responder may then confirm execution of the data feed by selecting "YES" which results in the data push (or data streaming) from the emergency data manager 100 to the emergency responder device 113. FIG. 21 illustrates one possible feed of information to an emergency responder device 113 from an onboard automobile crash detection system. The details of the car crash alert 2101 may be scrolled by the emergency responder and may also show further details 2102 by scrolling down the report in the emergency responder device 113 GUI.

Figure 22:
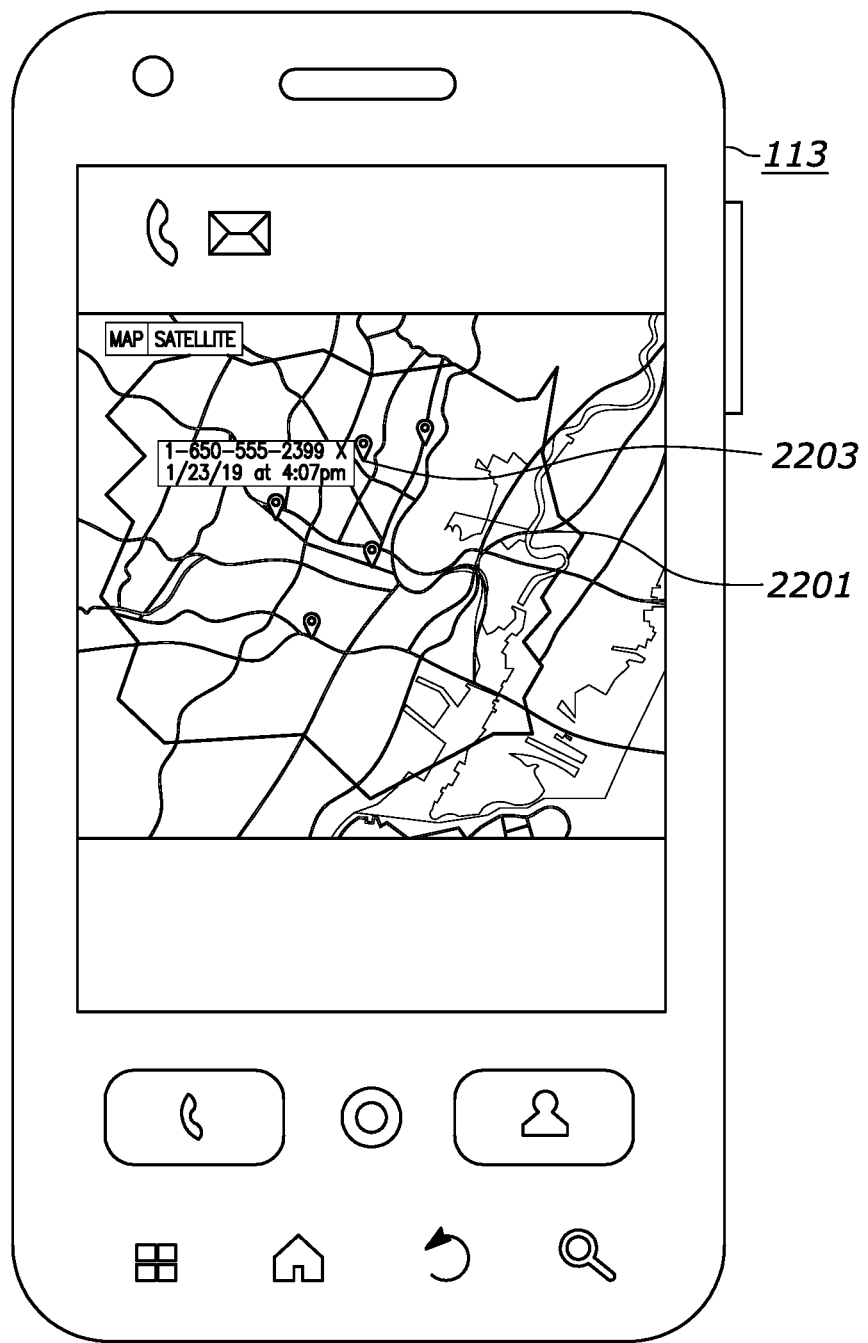
FIG. 22 is an example of an interactive map with location indicators that may be displayed on an emergency responder device display in response to selection of a link sent to the emergency responder device display from the emergency data manager.

FIG. 22 is an example of an interactive map 2201 with location indicators 2203 that may be displayed on an emergency responder device display in response to selection of a link sent to the emergency responder device display from the emergency data manager 100. For example, the interactive map 2201 may be displayed within a web browser providing a mobile friendly instance of the SaaS application hosted and provided by the emergency data manager 100. At least one location indicator 2203 may show the current location of an emergency caller and an information box may provide the emergency callers phone number and time of call. Further, the information box may provide a selectable link that initiates an emergency call back from the emergency responder device 113 to the emergency caller's mobile device so that the emergency responder can interact directly with the emergency caller. The interactive map 2201 may provide location indicators that update as the emergency caller moves and changes location and may show historic locations that remain static to show where the caller has been. The location indicators 2203 may have different colors, patterns or shapes to represent different emergency callers, and/or to distinguish between current and past locations of the emergency caller. The emergency responder may toggle between the interactive map 2201 and other information screens provided by the mobile friendly GUI. In other words, the mobile friendly GUI is a mobile version of the emergency data manager portal GUI.

The information provided to emergency responders via the mobile friendly portal GUI can be life saving because the emergency responder will have critical information and will know the specific location of the emergency caller so that they can arrive more quickly and the emergency scene and also have available equipment that may be needed to respond to the specific nature of emergency.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
   sending emergency data from a cloud server to an emergency network entity, the emergency data received by the cloud server from a mobile device;
   receiving an emergency call from the mobile device, by the emergency network entity, subsequent to receiving the emergency data from the cloud server;
   determining that an emergency responder device is in proximity to a location of the mobile device;
   sending a link from the emergency network entity to the emergency responder device located in proximity to the location of the mobile device in response to the emergency network entity receiving the emergency data and subsequently receiving the emergency call and determining that the emergency responder device is in proximity to the mobile device; and establishing a data connection between the cloud server and the emergency responder device in response to selection input from the emergency responder device selecting the link.

2. The method of claim 1, further comprising:
establishing a data connection between the mobile device and the emergency responder device in response to selection input from the emergency responder device selecting the link.

3. The method of claim 1, further comprising:
sending a second link from the cloud server in communication with the emergency network entity.

4. A method comprising:
sending emergency data from a cloud server to an emergency network entity, the emergency data received by the cloud server from a mobile device;
determining that an emergency responder device is in proximity to a location of the mobile device;
sending a link to the emergency responder device located in proximity to the location of the mobile device in response to the emergency network entity receiving the emergency data and determining that the emergency responder device is in proximity to the mobile device;
establishing a first data connection between the emergency responder device and the cloud server, in response to selection input from the emergency responder device selecting the link;
establishing a second data connection between the emergency responder device and the mobile device, in response to the selection input from the emergency responder device selecting the link; and
sending updates of the emergency data to the emergency responder device from the cloud server.

5. A method comprising:
sending emergency data from a cloud server to an emergency network entity, the emergency data received by the cloud server from a mobile device;
determining that an emergency responder device is in proximity to a location of the mobile device;
sending a link to the emergency responder device located in proximity to the location of the mobile device in response to the emergency network entity receiving the emergency data and determining that the emergency responder device is in proximity to the mobile device;
establishing a first data connection between the cloud server and the emergency responder device in response to selection input from the emergency responder device selecting the link;
establishing a second data connection between the emergency responder device and the emergency network entity, in response to the selection input from the emergency responder device selecting the link; and
sending updates of the emergency data to the emergency responder device from the cloud server.

6. A method comprising:
sending emergency data from a cloud server to an emergency network entity, the emergency data received by the cloud server from a mobile device;
determining that an emergency responder device is in proximity to a location of the mobile device based on location data for the mobile device received from the cloud server;
sending a link to the emergency responder device located in proximity to the location of the mobile device in response to the emergency network entity receiving the emergency data and determining that the emergency responder device is in proximity to the mobile device; and establishing a data connection between the cloud server and the emergency responder device in response to selection input from the emergency responder device selecting the link.

7. A method comprising:
receiving emergency data from a cloud server prior to receiving an emergency call from a mobile device, the emergency data received by the cloud server from the mobile device;
receiving the emergency call from the mobile device at an emergency network entity;
determining that an emergency responder device is in proximity to a location of the mobile device;
sending a link to the emergency responder device located in proximity to the location of the mobile device in response to determining that the emergency responder device is in proximity to the mobile device;
establishing a data connection between the mobile device and the emergency responder device in response to selection input from the emergency responder device selecting the link.

8. The method of claim 7, further comprising:
sending the link from the emergency network entity in response to receiving the emergency call from the mobile device.

9. The method of claim 7, further comprising:
receiving, by the emergency network entity, emergency data updates from the cloud server, the emergency data updates associated with the mobile device used to place the emergency call; and
sending the emergency data updates associated with the mobile device to the emergency responder device.

10. The method of claim 7, further comprising:
establishing a second data connection between the cloud server and the emergency responder device, through the emergency network entity; and
sending the emergency data to the emergency responder device over the second data connection.

11. The method of claim 7, wherein establishing a data connection between the mobile device and the emergency responder device in response to selection input from the emergency responder device selecting the link, comprises:
establishing a voice-over-IP (VOIP) call between the mobile device and the emergency responder device.

12. The method of claim 7, further comprising:
establishing an IP connection between the emergency network entity and the emergency responder device; and
sending emergency data to the emergency responder device from the emergency network entity.

13. A method comprising;
receiving an emergency call from a mobile device at an emergency network entity;
determining that an emergency responder device is in proximity to a location of the mobile device based on location data for the mobile device received from a cloud server;
sending a link to the emergency responder device located in proximity to the location of the mobile device in response to determining that the responder device is in proximity to the location of the mobile device; and establishing a data connection between the mobile device and the emergency responder device in response to selection input from the emergency responder device selecting the link.

14. A method comprising;
receiving an emergency call from a mobile device at an emergency network entity;
sending a link to an emergency responder device located in proximity to a location of the mobile device;
establishing a data connection between the mobile device and the emergency responder device in response to selection input from the emergency responder device selecting the link; and
determining data access authorization of the emergency responder device based on a threshold distance of the emergency responder device from the location of the mobile device.

15. A method comprising:
receiving emergency data from a cloud server at an emergency network entity, the emergency data received by the cloud server from a mobile device;
determining that an emergency responder device is in proximity to a location of the mobile device;
sending a link to the emergency responder device for an emergency responder dispatched to the location of the mobile device in response to determining that the emergency responder device is in proximity to the mobile device;
establishing a data connection between the cloud server and the emergency responder device in response to selection input from the emergency responder device selecting the link; and
pushing the emergency data from the cloud server to the emergency responder device.

16. The method of claim 15, further comprising:
establishing a data connection between the mobile device and the emergency responder device in response to the selection input from the emergency responder device selecting the link.

17. The method of claim 16, wherein establishing a data connection between the mobile device and the emergency responder device comprises:
establishing a voice-over-Internet-protocol call between the mobile device and the emergency responder device.

* * * * *